(12) United States Patent
Kobayashi

(10) Patent No.: US 7,633,179 B2
(45) Date of Patent: Dec. 15, 2009

(54) PASSENGER DETECTION APPARATUS FOR DETECTING BREAKAGE ON SHIELD LINE WITHOUT BEING AFFECTED BY PERIPHERAL SHIELD CABLES

(75) Inventor: Takeshi Kobayashi, Yokohama (JP)

(73) Assignee: Honda Elesys Co., Ltd., Kanagawa (JP)

( * ) Notice: Subject to any disclaimer, the term of this patent is extended or adjusted under 35 U.S.C. 154(b) by 142 days.

(21) Appl. No.: 11/902,953

(22) Filed: Sep. 26, 2007

(65) Prior Publication Data

US 2008/0093925 A1    Apr. 24, 2008

(30) Foreign Application Priority Data

Sep. 28, 2006    (JP) ............................ P2006-265539

(51) Int. Cl.
*G01R 31/02*    (2006.01)
(52) U.S. Cl. .................... 307/9.1; 324/500; 324/503
(58) Field of Classification Search ............ 307/9.1; 324/503
See application file for complete search history.

(56) References Cited

U.S. PATENT DOCUMENTS

| 6,163,082 | A * | 12/2000 | Yoshida et al. ............ 307/10.1 |
| 6,356,194 | B1 | 3/2002 | Fukui et al. |
| 2001/0026162 | A1 | 10/2001 | Nagai et al. |
| 2003/0047983 | A1 | 3/2003 | Wanami et al. |
| 2006/0164254 | A1 | 7/2006 | Kamizono et al. |
| 2006/0231320 | A1 | 10/2006 | Kamizono et al. |

FOREIGN PATENT DOCUMENTS

| JP | 3-233391 A | 10/1991 |
| JP | 04-326072 A | 11/1992 |
| JP | 04-335170 A | 11/1992 |
| JP | 7-270541 A | 10/1995 |
| JP | 11-258354 A | 9/1999 |
| JP | 11-268607 B2 | 10/1999 |
| JP | 11-271463 A | 10/1999 |
| JP | 11-334451 A | 12/1999 |
| JP | 2000-249773 A | 9/2000 |
| JP | 2001-270417 A | 10/2001 |
| JP | 3353817 | 9/2002 |
| JP | 2003-80989 A | 3/2003 |
| JP | 2003-237443 A | 8/2003 |
| JP | 2004-123087 A | 4/2004 |

(Continued)

*Primary Examiner*—Stephen W Jackson
*Assistant Examiner*—Adi Amrany
(74) *Attorney, Agent, or Firm*—Arent Fox LLP.

(57) ABSTRACT

A passenger detection apparatus includes sensors arranged on a seat in a vehicle; shield cables corresponding to the sensors, wherein one end the core wire is connected to the corresponding one of the sensors; a measurement signal output device for outputting a measurement AC signal; a device for detecting a current output from the measurement signal output device; a device for outputting a capacitance canceling AC signal, which has the same phase and the same level as those of the measurement AC signal; a device for selectively applying one of the measurement AC signal and a DC voltage to the other end of each shield cable; and a device for selectively applying one of the capacitance canceling AC signal and a second signal, which has a different waveform from that of the measurement AC signal, to the shield of each shield cable.

10 Claims, 20 Drawing Sheets

FOREIGN PATENT DOCUMENTS

| | | |
|---|---|---|
| JP | 2006-242807 A | 9/2006 |
| JP | 2006-242907 A | 9/2006 |
| JP | 2006-292631 A | 10/2006 |
| JP | 2006-341733 A | 12/2006 |
| WO | WO-00/38959 A1 | 7/2000 |

* cited by examiner

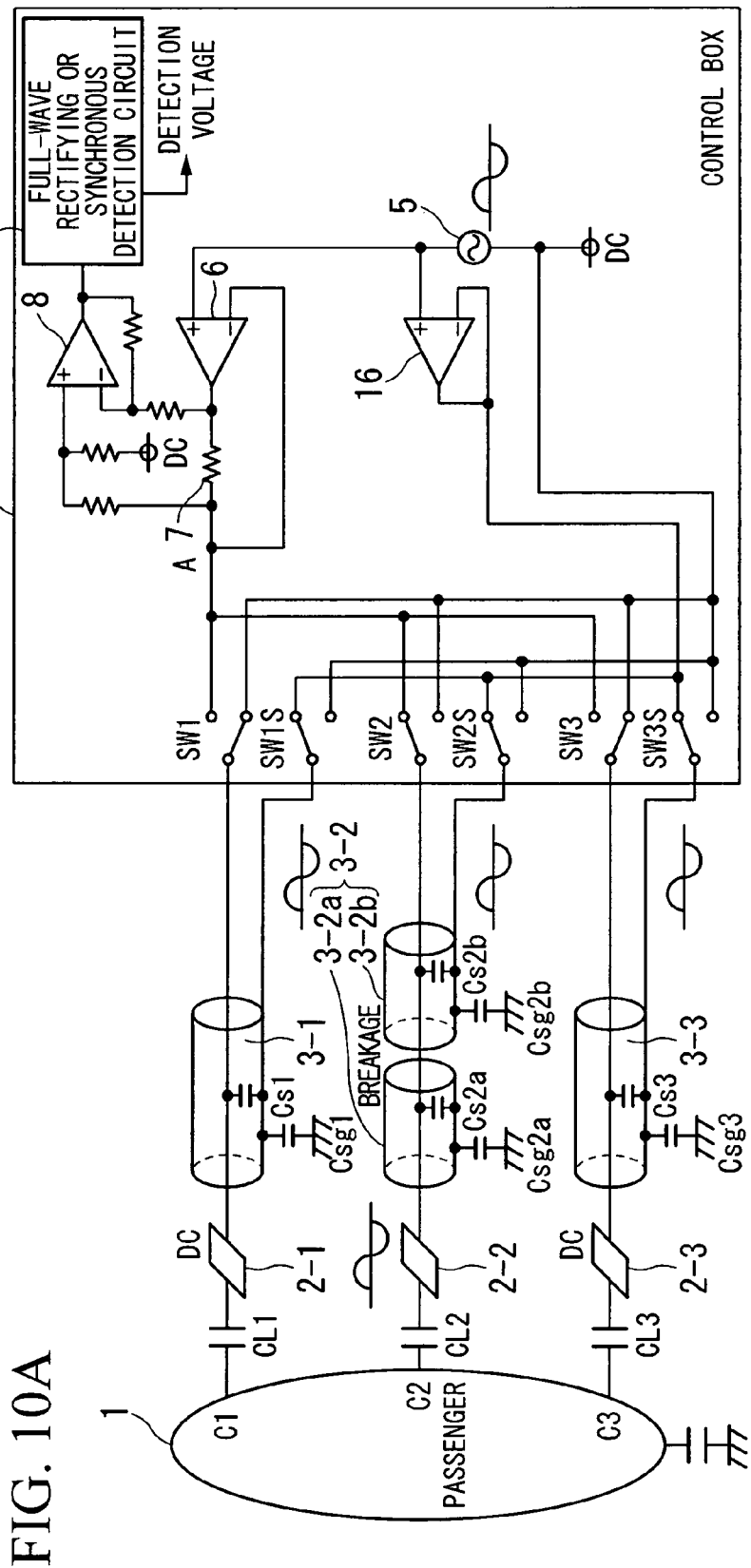

$$\left(C2 + \frac{Cs2a \times Csg2a}{Cs2a + Csg2a} + Cs2b\right)$$

PASSENGER DETECTION APPARATUS FOR DETECTING BREAKAGE ON SHIELD LINE WITHOUT BEING AFFECTED BY PERIPHERAL SHIELD CABLES

BACKGROUND OF THE INVENTION

1. Field of the Invention

The present invention relates to a passenger (state) detection apparatus for detecting a seated state of a passenger seated in a vehicle, in particular, a passenger detection apparatus which can detect a breakage on a shield line for connecting a detector main body (i.e., control box) and a sensor.

Priority is claimed on Japanese Patent Application No. 2006-265539, filed Sep. 28, 2006, the content of which is incorporated herein by reference.

2. Description of the Related Art

In recent vehicles such as an automobile for riding, it is required to detect seated states, such as whether an adult or a child is sitting on a passenger seat (or an assistant driver's seat), or whether a child seat is installed on a passenger seat. This is because when an airbag apparatus is installed at a passenger seat, control for making an airbag operable or inoperable should be performed depending on the seated state of the passenger seat.

Conventionally, a passenger detection apparatus for detecting such a seated state has been developed (see Patent Document 1). In the disclosed passenger detection apparatus, a sensor for detection is attached to a target seat in a vehicle, and a high-frequency low voltage is applied to this sensor. The seated state of a passenger is determined by using a phenomenon such that the current, which flows through the sensor, changes depending on the state of the passenger on the target seat.

Patent Document 1: Japanese Patent No. 3353817

In the above conventional passenger detection apparatus, a high-frequency low voltage is used, and thus a shield line is employed for connecting the control box to the sensor. If breaking of the shield line occurs, passenger (state) detection may not be accurately performed. Therefore, a technique for detecting a breakage of the shield line is required. However, in a state in which a plurality of shield cables are crowdedly bundled, detection of a breakage in the shield line may not be accurately performed. This is because when a plurality of shield cables are positioned close to each other, a stray capacitance between a shield line having a breakage and another shield line adjacent thereto appears, and a voltage of the adjacent shield line appears via the stray capacitance on the shield line having the breakage, so that it looks as if an accurate shield voltage were applied to the shield line having the breakage.

SUMMARY OF THE INVENTION

In light of the above circumstances, an object of the present invention is to provide a passenger detection apparatus for reliably detecting a breakage of a shield line without being affected by peripheral shield cables.

Therefore, the present invention provides a passenger detection apparatus comprising:

a plurality of sensors arranged on a seat in a vehicle;

a plurality of shield cables corresponding to the sensors, wherein each shield cable has a shield and a core wire, wherein one end the core wire is connected to the corresponding one of the sensors;

a measurement signal output device for outputting a measurement AC signal;

a current detection device for detecting a current output from the measurement signal output device;

a canceling signal output device for outputting a capacitance canceling AC signal, which has the same phase and the same level as those of the measurement AC signal;

a first selection device for selectively applying one of the measurement AC signal and a DC voltage to the other end of each shield cable; and a second selection device for selectively applying one of the capacitance canceling AC signal and a second signal, which has a different waveform from that of the measurement AC signal, to the shield of each shield cable.

The passenger detection apparatus may further comprise:

a control device for controlling the first selection device and the second selection device, wherein the control device performs:

a first process of controlling the first selection device so as to apply the measurement AC signal to a target one of the sensors via the core wire of the corresponding shield cable and to simultaneously apply the DC voltage to the other sensors via the core wires of the corresponding shield cables, and also controlling the second selection device so as to apply the capacitance canceling AC signal to the shield of each shield cable; and a second process of controlling the first selection device so as to apply the measurement AC signal to the target sensor via the core wire of the corresponding shield cable, and to simultaneously apply the DC voltage to the other sensors via the core wires of the corresponding shield cables, and also controlling the second selection device so as to apply the second signal to the shield of the shield cable connected to the target sensor, and to simultaneously apply the capacitance canceling AC signal to the shield of each shield cable connected to the other sensors.

The passenger detection apparatus may further comprise:

an adjustment device for adjusting the level of the measurement AC signal and the capacitance canceling AC signal.

In a typical example, the second selection device includes:

a switch device for switching on or off the capacitance canceling AC signal in accordance with the control of the control device; and an amplifier for amplifying the capacitance canceling AC signal when the switch device is on, so as to apply the amplified signal to the shield of the relevant shield cable, and amplifying the second signal when the switch device is off, so as to apply the amplified signal to the above shield.

In another typical example, the second selection device includes:

an amplifier for amplifying the capacitance canceling AC signal; and a transistor for grounding an input terminal of the amplifier in accordance with the control of the control device.

In another typical example, the second selection device includes:

a resistor for applying the capacitance canceling AC signal to the shield of the relevant shield cable; and a transistor for grounding a part between the resistor and the relevant shield cable in accordance with the control of the control device.

In another typical example, the second selection device includes:

an amplifier for amplifying the capacitance canceling AC signal; and a transistor for connecting an input terminal of the amplifier to a positive voltage terminal in accordance with the control of the control device.

In another typical example, the second selection device includes:

a resistor for applying the capacitance canceling AC signal to the shield of the relevant shield cable; and a transistor for connecting a part between the resistor and the relevant shield cable to a positive voltage terminal in accordance with the control of the control device.

The passenger detection apparatus may further comprise:

an AC signal output device for outputting an AC signal, which has a different waveform from that of the measurement AC signal and functions as the second signal.

Typically, the second signal is a DC voltage.

In accordance with the present invention, even when the shield cables for connecting the detector main body and the sensors are arranged close to each other, a breakage on a shield line of the shield cables can be reliably detected.

BRIEF DESCRIPTION OF THE DRAWINGS

FIG. 10A is a circuit diagram for explaining the operation when the shield cables are arranged distant from each other, and one of the shield cables itself has a breakage. FIG. 10B shows an equivalent circuit of the capacitance observed from the point A in FIG. 10A.

DETAILED DESCRIPTION OF THE INVENTION

Hereinafter, embodiments in accordance with the present invention will be described with reference to the appended figures.

First Embodiment

A first embodiment of the present invention will be explained below.

Figure 1A:
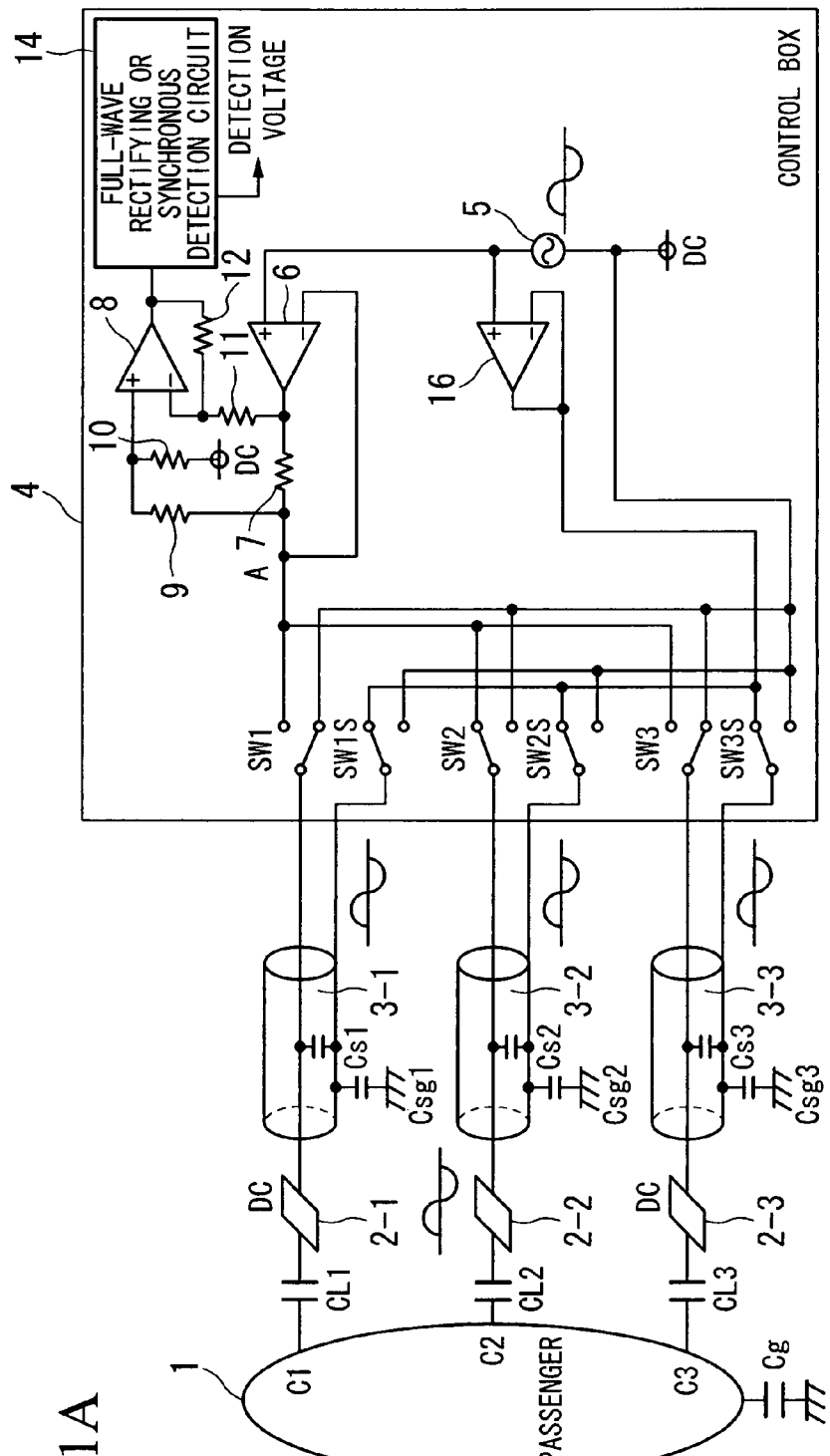
FIG. 1A is a circuit diagram showing the structure of the passenger detection apparatus as a first embodiment in accordance with the present invention.

FIG. 1A is a circuit diagram showing the structure of the passenger detection apparatus as the first embodiment. In FIG. 1A, reference numeral 1 indicates a passenger sitting on a seat in a vehicle. The passenger 1 can be treated as a conductor. Reference numerals 2-1 to 2-3 indicate sensors attached to the seat at regular intervals. Each sensor may be made by using a conductive cloth, a material into which thin metal wires are woven, a metal plate, or the like. Reference symbol CL1 indicates a capacitance between the sensor 2-1 and the passenger 1, reference symbol CL2 indicates a capacitance between the sensor 2-2 and the passenger 1, reference symbol CL3 indicates a capacitance between the sensor 2-3 and the passenger 1, and reference symbol Cg indicates a capacitance between the passenger 1 and the earth (i.e., the vehicle body).

Reference numerals 3-1 to 3-3 respectively indicate shield cables for connecting the sensors 2-1 to 2-3 to a control box 4. The control box 4 is installed inside the seat or in a dashboard, or the like, and outputs a detection voltage for detecting the state of the passenger 1 based on a current, which flows through the core wire of each shield cable. In the control box 4, reference numeral 5 indicates an AC (alternating current) oscillator for outputting a sine-wave AC signal of a high-frequency low voltage, reference numeral 6 indicates an operation amplifier for amplifying the signal output from the AC oscillator 5, and reference numeral 7 indicates a current detection resistor for detecting the current, which flows through each core wire of the shield cables 3-1 to 3-3. The inverse input terminal of the operation amplifier 6 is connected to the other terminal ("one terminal" will appear later for convenience of explanation) (see point A) of the current detection resistor 7, thereby preventing the voltage at the point A from varying due to a voltage drop through the current detection resistor 7. The signal output from the operation amplifier 6 is output as an AC signal for relevant measurement.

Reference numeral 8 indicates an operation amplifier for amplifying the voltage between both ends of the current detection resistor 7. Reference numeral 9 indicates an input resistor for inputting the voltage at point A into the non-inverse input terminal of the operation amplifier 8. Reference numeral 10 indicates a resistor for applying a positive bias to the above non-inverse input terminal of the operation amplifier 8. Reference numeral 11 indicates an input resistor for inputting the voltage at one terminal of the current detection resistor 7 into the inverse input terminal of the operation amplifier 8. Reference numeral 12 indicates a resistor for feeding back the signal output from the operation amplifier 8 to the inverse input terminal thereof. Reference numeral 14 indicates a full-wave rectifying or synchronous detection circuit for performing full-wave rectification or synchronous detection of the signal output from the operation amplifier 8. The result of this performance is output from the circuit 14 as a detection voltage which indicates the state of the passenger 1.

Reference numeral 16 indicates an operation amplifier which functions as a voltage follower for amplifying the signal output from the AC oscillator 5. The signal output from the operation amplifier 16 is used as a capacitance canceling AC signal. Reference symbols SW1 to SW3 indicate semiconductor switches. The common terminal of the switch SW1 is connected to the core wire of the shield cable 3-1, and the first and second contacts of the switch SW1 are respectively connected to the other terminal (at point A) of the current detection resistor 7 and a DC (direct current) voltage DC. Similarly, the common terminal of the switch SW2 is connected to the core wire of the shield cable 3-2, and the first and second contacts of the switch SW2 are respectively connected to the other terminal (at point A) of the current detection resistor 7 and the DC voltage DC. Also similarly, the common terminal of the switch SW3 is connected to the core wire of the shield cable 3-3, and the first and second contacts of the switch SW3 are respectively connected to the other terminal (at point A) of the current detection resistor 7 and the DC voltage DC.

Reference symbols SW1S to SW3S also indicate semiconductor switches. The common terminal of the switch SW1S is connected to the shield of the shield cable 3-1, and the first and second contacts of the switch SW1 are respectively connected to the output terminal of the operation amplifier 16 and the DC voltage DC. Similarly, the common terminal of the switch SW2S is connected to the shield of the shield cable 3-2, and the first and second contacts of the switch SW2S are respectively connected to the output terminal of the operation amplifier 16 and the DC voltage DC. Also similarly, the common terminal of the switch SW3S is connected to the shield of the shield cable 3-3, and the first and second contacts of the switch SW3S are respectively connected to the output terminal of the operation amplifier 16 and the DC voltage DC.

Switching of the above switches SW1 to SW3 and SW1S to SW3S is performed and controlled by a control device (not shown); however, it may be performed manually.

Below, the operation of the above-described passenger detection apparatus will be explained.

(1) In the Case in which the Shield Cables are Arranged Distant from Each Other (See FIGS. 1A to 5B)

(1-1) In the Case in which Each Shield Cable has No Breakage (see FIGS. 1A to 3B)

Here, the common terminal of the switch SW2 is connected to the first contact (thereof), the common terminals of the switches SW1 and SW3 are each connected to the second contact (of each of them), and the common terminals of the switches SW1S to SW3S are each connected to the first contact (of each of them). The above connection state is called a "first connection state". In this case, the capacitance CL2 is connected via the core wire of the shield cable 3-2 to the point A. To the capacitance CL2, the capacitances CL1, CL3, and Cg are connected via the passenger 1. With respect to the capacitances CL1 and CL3, the terminals opposite to the passenger 1 are respectively connected via the core wires of the shield cables 3-1 and 3-3 and also via switches SW1S and SW3S to the DC voltage DC. With respect to the capacitance Cg, the terminal opposite to the passenger 1 is grounded. In this case, C2 is the total capacitance of the above capacitances CL2, CL1, CL3, and Cg.

In addition, a capacitance Cs2 is present between the core wire and the shield of the shield cable 3-2, and a capacitance Csg2 is present between this shield and the ground (or earth). However, the shield of the shield cable 3-2 is connected to the output terminal of the operation amplifier 16 via the switch SW2S, so that the shield and the core wire have the same electric potential. Therefore, no current flows through the capacitance Cs2, and thus the relevant measurement is not affected by the capacitance Cs2.

Figure 1B:
FIG. 1B shows an equivalent circuit of the capacitance observed from the point A in FIG. 1A.
Figure 2:
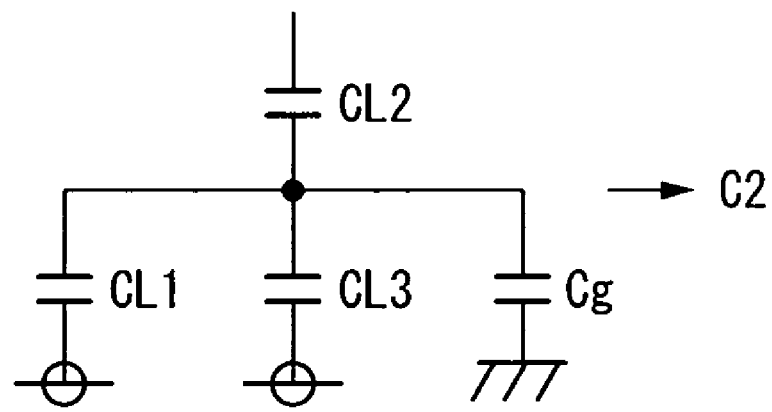
FIG. 2 is a circuit diagram for explaining the capacitance C2 in the passenger detection apparatus

Accordingly, the equivalent circuit of the capacitance observed from the point A is shown in FIG. 1B, and thus the capacitance observed from the point A is equal to the capacitance C2.

Therefore, when an AC signal having a high-frequency low voltage is output from the AC oscillator 5, a current corresponding to the capacitance C2 flows through the current detection resistor 7. Accordingly, a voltage corresponding to the capacitance C2 is output from the operation amplifier 8, thereby outputting the detection voltage corresponding to C2 from the full-wave rectifying or synchronous detection circuit 14.

Figure 3A:
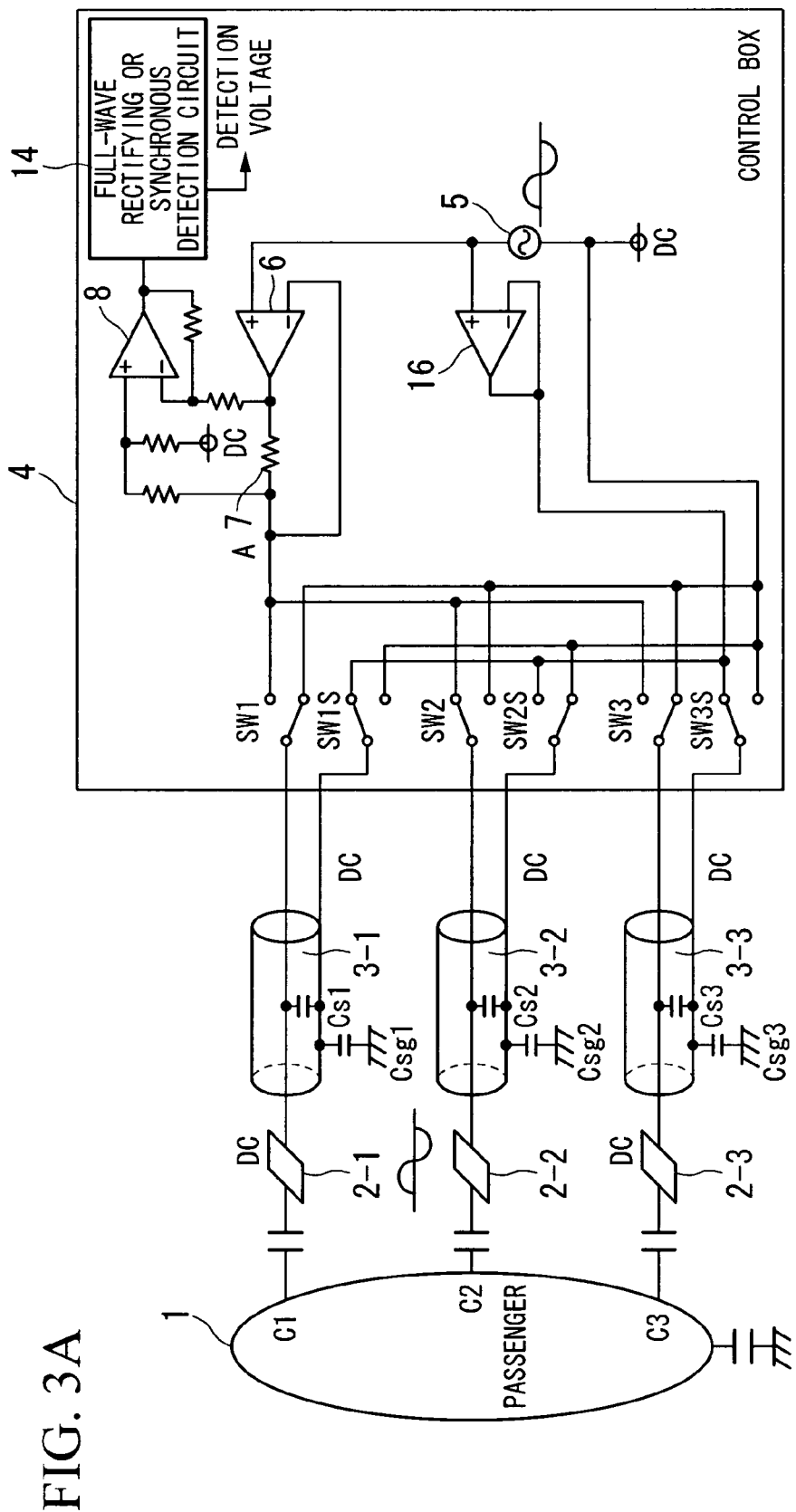
FIG. 3A is a circuit diagram for explaining the operation when the shield cables are arranged distant from each other, and there is no breakage with respect to the shield cables in the passenger detection apparatus.

Next, as shown in FIG. 3A, the common terminal of the switch SW2 is connected to the first contact (thereof), the common terminals of the switches SW1 and SW3 are each connected to the second contact (of each of them), the common terminal of the switch SW2S is connected to the second contact (thereof), and the common terminals of the switches SW1S and SW3S are each connected to the first contact (of each of them). This connection state is called a "second connection state". In this case, the shield of the shield cable 3-2 is connected via the switch SW2S to the DC voltage DC. Therefore, an AC current flows through the capacitance Cs2, and thus the relevant measurement is affected by the capacitance Cs2.

Figure 3B:
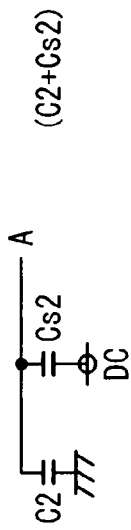
FIG. 3B shows an equivalent circuit of the capacitance observed from the point A in FIG. 3A.

Accordingly, the equivalent circuit of the capacitance observed from the point A is shown in FIG. 3B, and thus the capacitance observed from the point A is equal to "C2+Cs2".

(1-2) In the Case in which a Wiring Line Connected to a Shield Cable Has a Breakage (see FIGS. 4A to 5B)

Figures 4A, 4B:
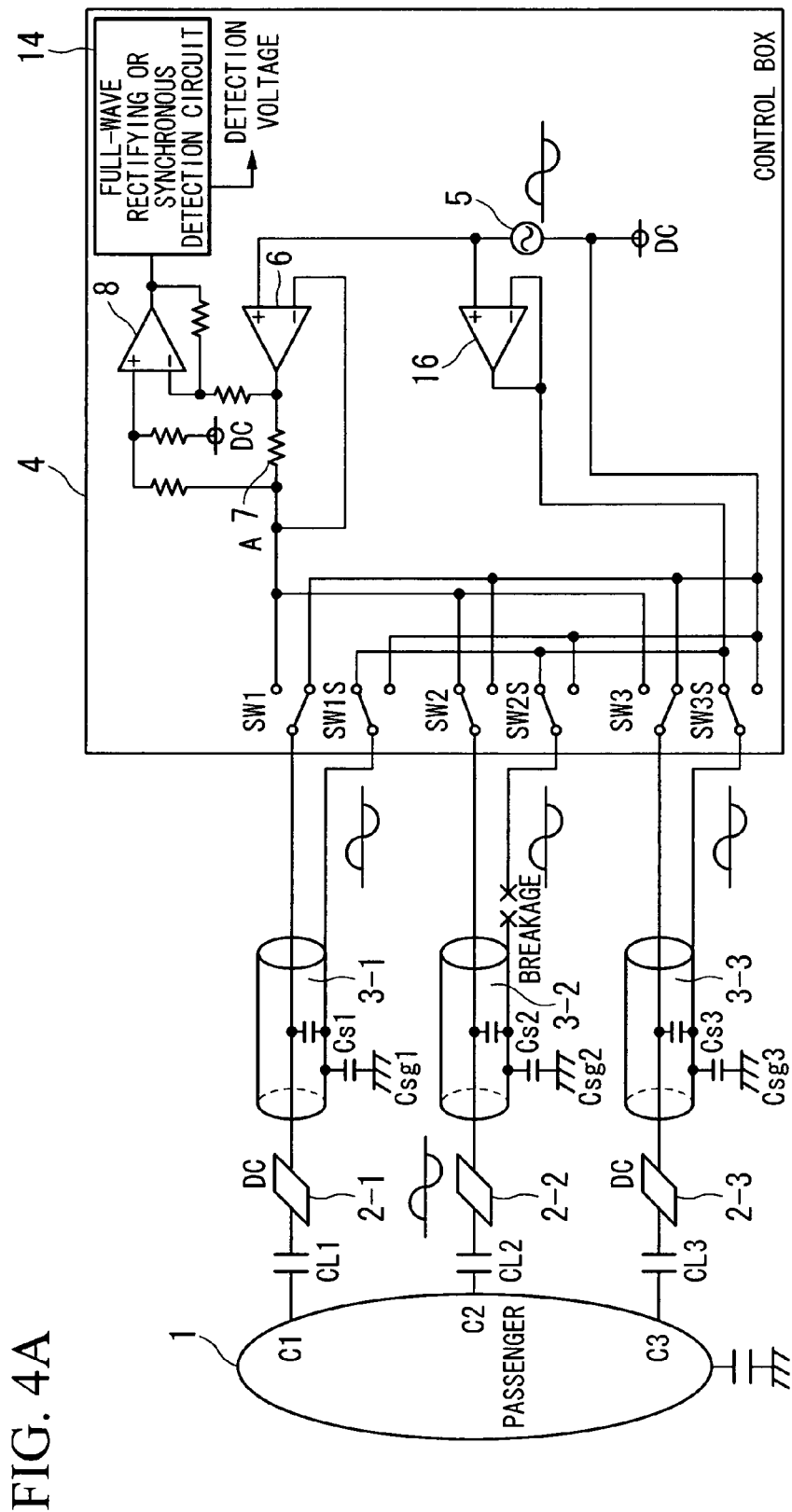
FIG. 4A is a circuit diagram for explaining the operation when the shield cables are arranged distant from each other, and a wiring line connected to a shield cable has a breakage in the passenger detection apparatus.
FIG. 4B shows an equivalent circuit of the capacitance observed from the point A in FIG. 4A.

Here, it is assumed that a breakage occurs on a wiring line between the shield of the shield cable 3-2 and the switch SW2S (see FIG. 4A). In this case, when the switches SW1 to SW3 and the switches SW1S to SW3S are set to the first connection state, the shield of the shield cable 3-2 is not connected to the output terminal of the operation amplifier 16 due to the breakage. Accordingly, as the shield of the shield cable 3-2 functions as a simple conductor, an AC current flows through the capacitances Cs2 and Csg2, which affect the relevant measurement. That is, in this case, the equivalent circuit of the capacitance observed from the point A is formed by connecting the capacitance C2 and "a capacitance of the serial circuit of the capacitances Cs2 and Csg2" in parallel (see FIG. 4B), and thus the capacitance observed from the point A is equal to "C2+(Cs2·Csg2)/(Cs2+Csg2)".

Figures 5A, 5B:
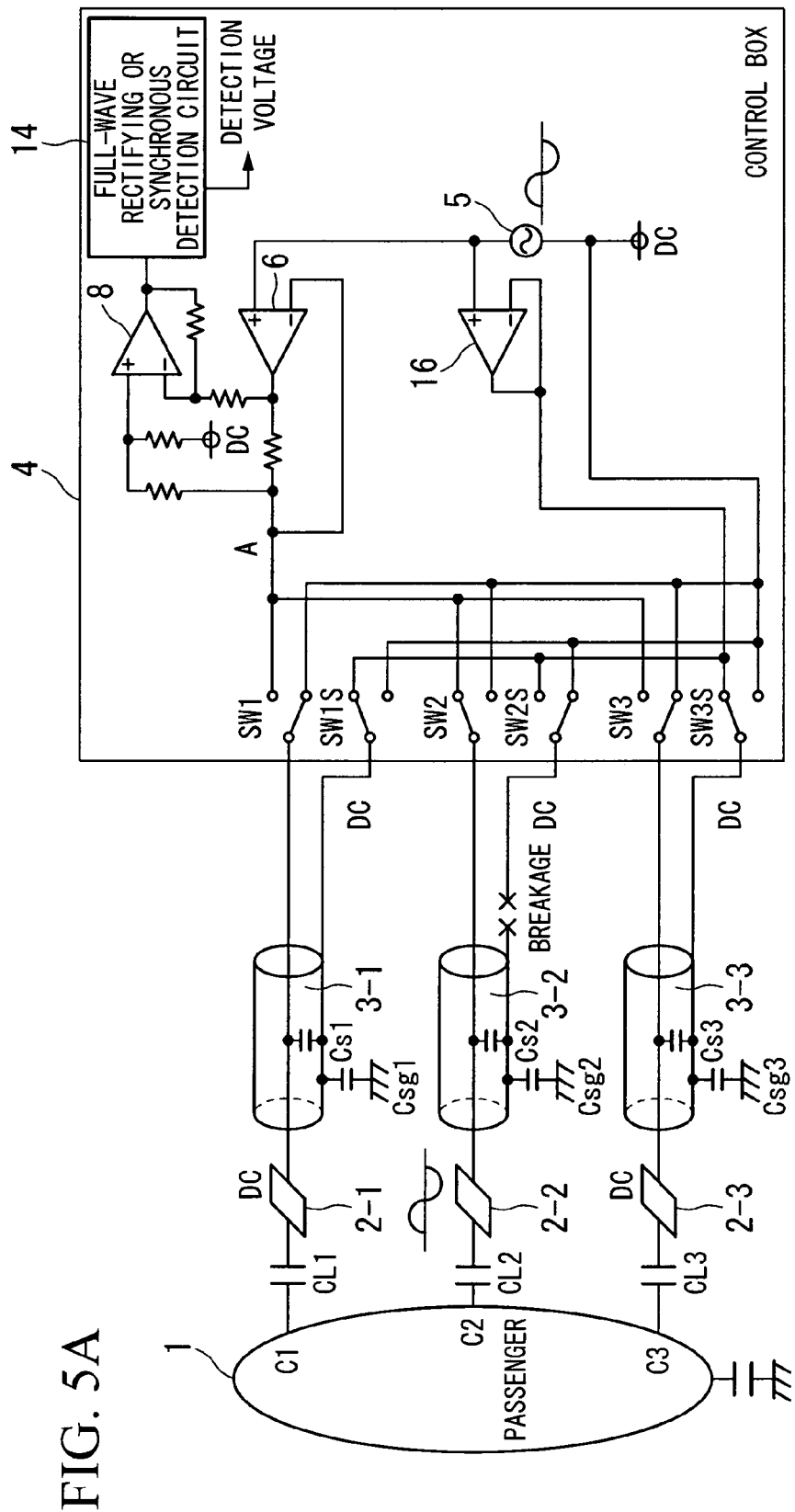
FIG. 5A is also a circuit diagram for explaining the operation when the shield cables are arranged distant from each other, and a wiring line connected to a shield cable has a breakage in the passenger detection apparatus.
FIG. 5B shows an equivalent circuit of the capacitance observed from the point A in FIG. 5A.

Additionally, even when the switches SW1 to SW3 and the switches SW1S to SW3S are set to the second connection state (see FIG. 5A), the capacitance observed from the point A is identical to that in the first connection state, due to the breakage on the wiring line between the shield of the shield cable 3-2 and the switch SW2S (see FIG. 5B).

As can be clearly understood by the above explanation, when no breakage is present on the wiring line between the shield of the shield cable 3-2 and the switch SW2S, the measured capacitance (i.e., the detection voltage output from the full-wave rectifying or synchronous detection circuit 4) has a different value between the first and second connection states of the switches SW1 to SW3 and SW1S to SW3S (the difference corresponds to the capacitance Cs2). In contrast, when there is a breakage of the wire line, such a difference does not occur. Therefore, it is possible to determine the presence/absence of a breakage.

(2) In the Case in which the Shield Cables are Arranged Close to Each Other (see FIGS. 6A to 9B)

(2-1) In the Case in which Each Shield Cable Has No Breakage (see FIGS. 6A to 7B)

Figures 6A, 6B:
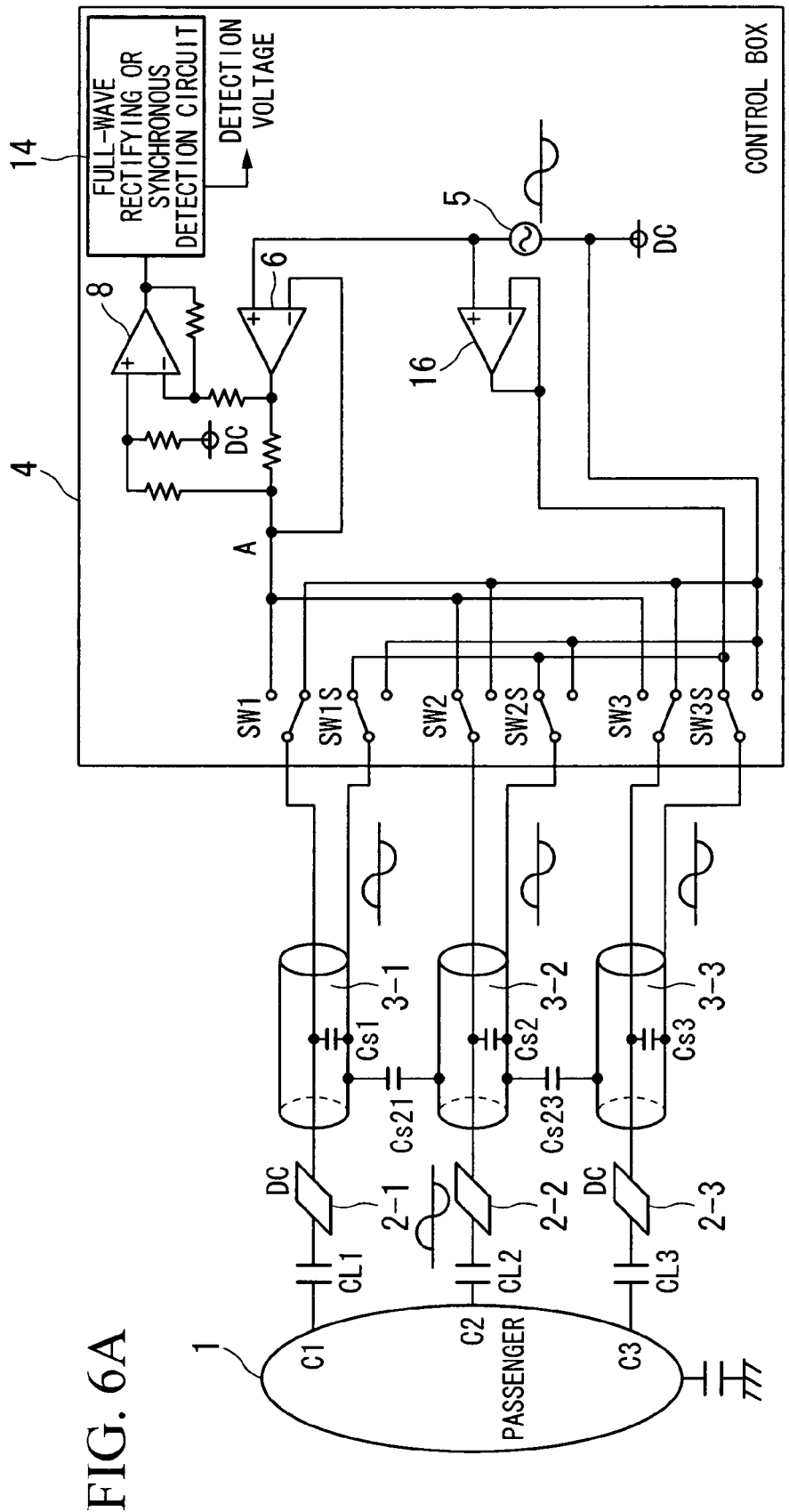
FIG. 6A is a circuit diagram for explaining the operation when the shield cables are arranged close to each other, and there is no breakage with respect to the shield cables in the passenger detection apparatus.
FIG. 6B shows an equivalent circuit of the capacitance observed from the point A in FIG. 6A.
Figure 7A:
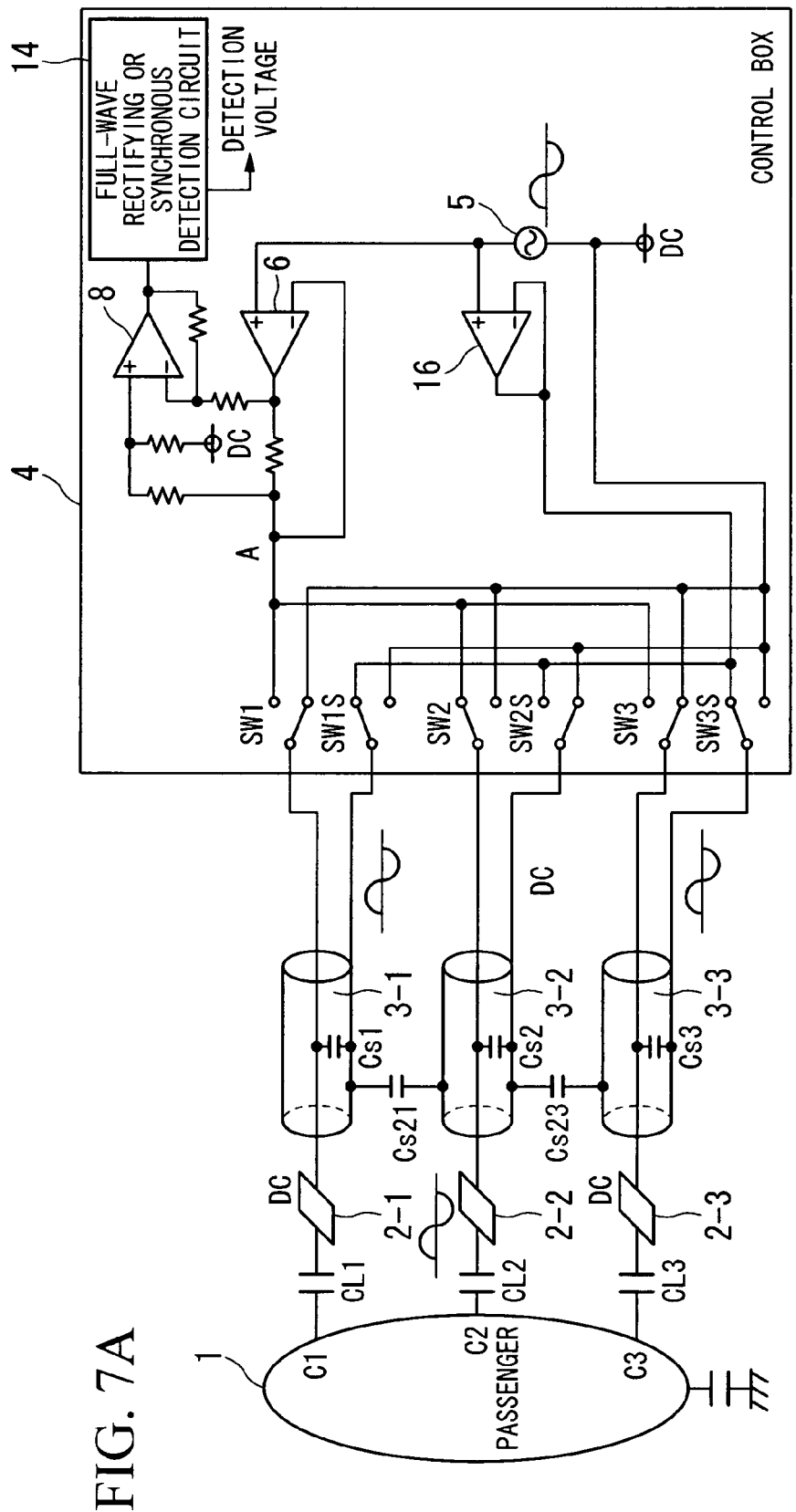
FIG. 7A is also a circuit diagram for explaining the operation when the shield cables are arranged close to each other, and there is no breakage with respect to the shield cables in the passenger detection apparatus.
Figure 7B:
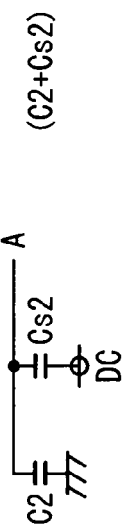
FIG. 7B shows an equivalent circuit of the capacitance observed from the point A in FIG. 7A.
Figure 8A:
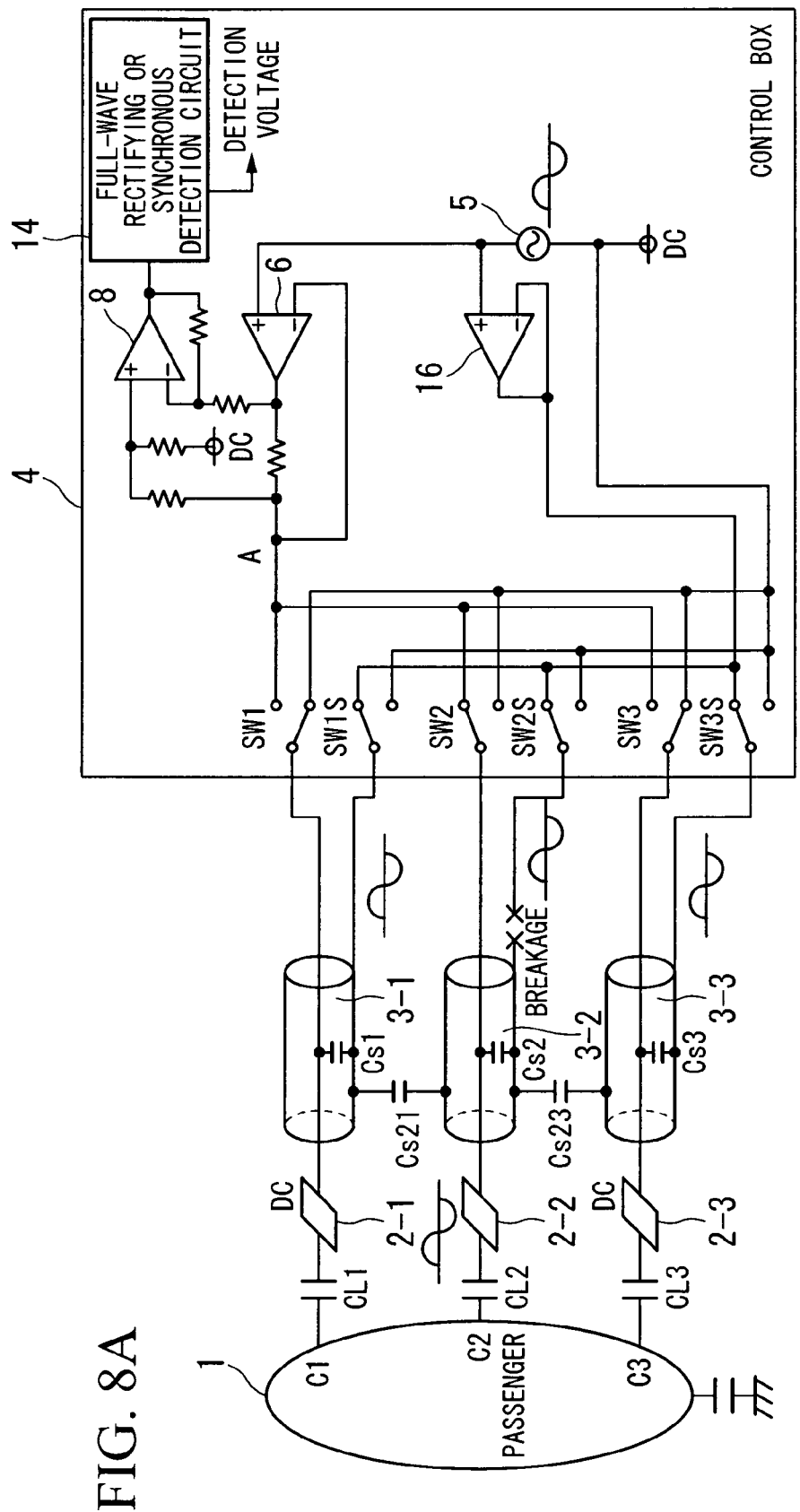
FIG. 8A is a circuit diagram for explaining the operation when the shield cables are arranged close to each other, and a wiring line connected to a shield cable has a breakage in the passenger detection apparatus.
Figure 8B:
FIG. 8B shows an equivalent circuit of the capacitance observed from the point A in FIG. 8A.
Figure 9A:
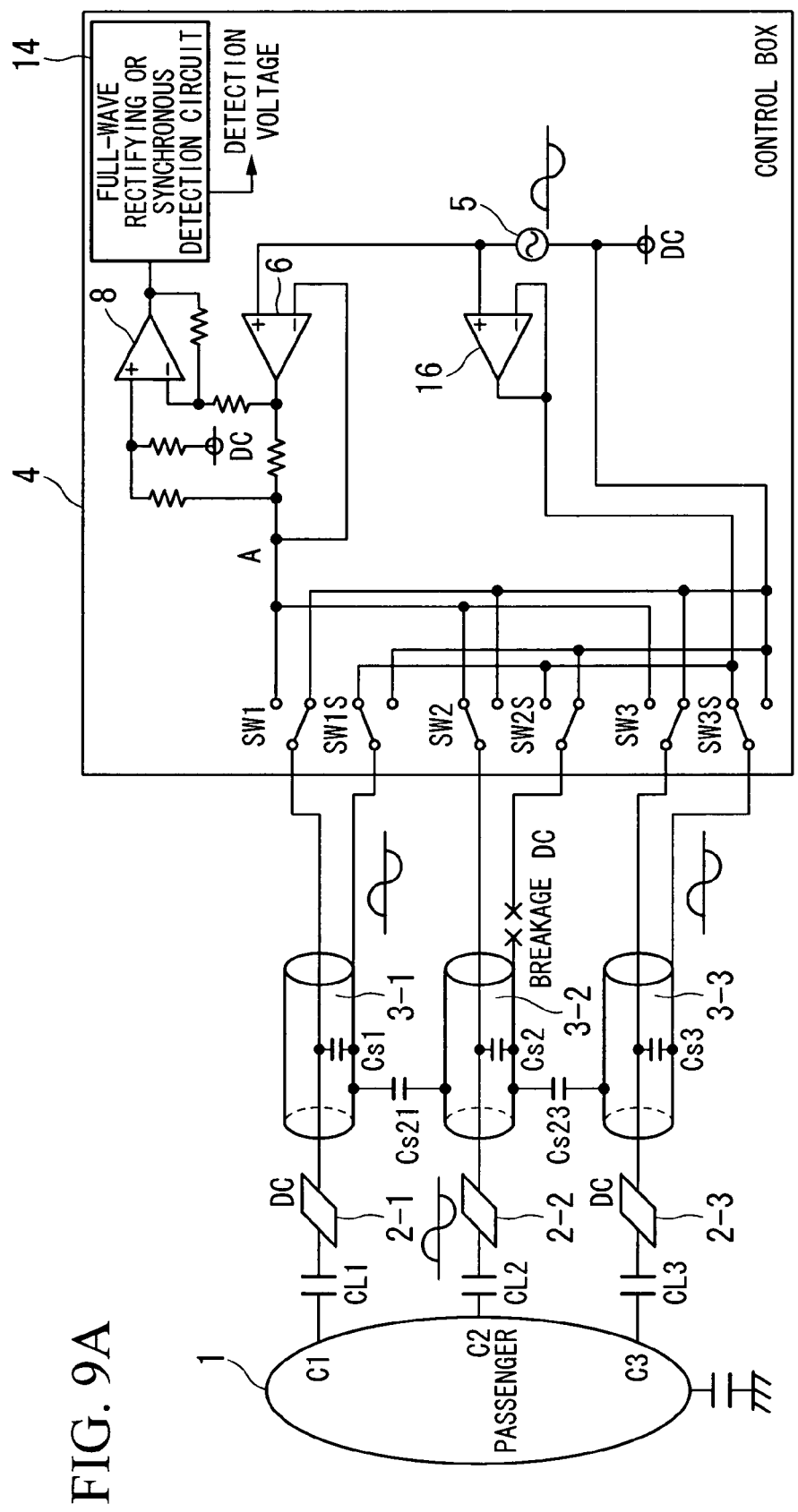
FIG. 9A is also a circuit diagram for explaining the operation when the shield cables are arranged close to each other, and a wiring line connected to a shield cable has a breakage in the passenger detection apparatus.
Figure 9B:
FIG. 9B shows an equivalent circuit of the capacitance observed from the point A in FIG. 9A.

When the shield cables 3-1 to 3-3 are arranged close to each other, a capacitance Cs21 is present between the shield cables 3-1 and 3-2, and a capacitance Cs23 is present between the shield cables 3-2 and 3-3 (see FIG. 6A). However, when the switches SW1 to SW3 and the switches SW1S to SW3S are set to the first connection state, the signal output from the operation amplifier 16 is supplied to each shield of the shield cables 3-1 to 3-3, so that each shield and the core wire of the shield cable 3-2 have the same electric potential. Therefore, no current flows through the capacitances Cs21 and Cs23, which thus do not affect the relevant measurement. Accordingly, in this case, the capacitance observed from the point A is equal to the capacitance C2.

On the other hand, when the switches SW1 to SW3 and the switches SW1S to SW3S are set to the second connection state (see FIG. 7A), only the shield of the shield cable 3-2 is connected to the DC voltage DC. Therefore, similar to the case shown in FIGS. 3A and 3B, the capacitance Cs2 affects the relevant measurement; however, the capacitances Cs21 and Cs23 do not affect the measurement. That is, in this case, the capacitance observed from the point A is equal to "C2+Cs2" (see FIG. 7B).

(2-2) In the Case in which a Wiring Line Connected to a Shield Cable Has a Breakage (see FIGS. 8A to 9B)

Here, it is assumed that a breakage occurs on a wiring line which connects the shield of the shield cable 3-2 and the switch SW2S. In this case, when the switches SW1 to SW3 and the switches SW1S to SW3S are set to the first connection state (see FIG. 8A), the AC signal output from the operation amplifier 16 is applied to each shield of the shield cables 3-1 to 3-3, and this AC signal is applied via the capacitances Cs21 and Cs23 to the shield of the shield cable 3-2. That is, in the case in which the capacitances Cs21 and Cs23 are present, even when a breakage occurs between the shield of the shield cable 3-2 and the switch SW2S, the AC signal is applied to the shield of the shield cable 3-2 via the capacitances Cs21 and Cs23. Accordingly, the capacitance observed from the point A is approximately equal to that observed when there is no breakage (i.e., C2) (see FIG. 8B).

Even when the switches SW1 to SW3 and the switches SW1S to SW3S are set to the second connection state (see FIG. 9A), no DC voltage DC is applied via the switch SW2S to the shield of the shield cable 3-2, due to the breakage. Also in this case, the AC signal is applied to the shield of the shield cable 3-2 via the capacitances Cs21 and Cs23, and thus the capacitance observed from the point A is equal to that (i.e., C2) shown in FIG. 8B (see FIG. 9B).

Accordingly, in the case in which the shield cables are arranged close to each other, when no breakage occurs on the wiring line between the shield cable 3-2 and the switch SW2S, the measured capacitance (corresponding to the detection voltage output from the full-wave rectifying or synchronous detection circuit 4) has a different value between the first and second connection states of the switches SW1 to SW3 and SW1S to SW3S (the difference corresponds to the capacitance Cs2). In contrast, when there is a breakage of the wiring line, such a difference does not occur. Therefore, it is possible to determine the presence/absence of a breakage.

In the above examples, three shield cables are shown. However, in the actual wiring arrangement, a larger number of wiring lines are arranged, and thus the electric potential of the shield of the shield cable 3-2 is substantially identical to the electric potential (corresponding to the output of the operation amplifier 16) of each shield of the other shield cables.

(3) In the Case in which the Shield Cable Itself Has a Breakage (see FIGS. 10A to 13B)

(3-1) In the Case in which the Shield Cables are Arranged Distant From Each Other (See FIGS. 10A to 11B)

Here, it is assumed that a shield breakage occurs at the center of the shield cable 3-2 (see FIG. 10A). In the shield cable 3-2, a shield part toward the sensor 2-2 is called a shield 3-2a, while the remaining shield part toward the switch SW2S is called a shield 3-2b. In addition, the capacitance between the shield 3-2a and the corresponding core wire is called Cs2a, the capacitance between the shield 3-2b and the corresponding core wire is called Cs2b, the capacitance between the shield 3-2a and the ground is called Csg2a, and the capacitance between the shield 3-2b and the ground is called Csg2b.

In this case, when the switches SW1 to SW3 and the switches SW1S to SW3S are set to the first connection state (see FIG. 10A), the AC signal output from the operation amplifier 16 is applied to the shield 3-2b, so that no current flows through the capacitance Cs2b. Accordingly, the capacitance Cs2b does not affect the relevant measurement. In contrast, no AC signal is applied to the shield 3-2a due to the breakage, so that the shield 3-2a functions as a simple conductor. Therefore, a current flows through the capacitances Cs2a and Csg2a, which affect the relevant measurement. That is, in this case, the equivalent circuit of the capacitance observed from the point A is as shown in FIG. 10B, and thus is computed by the following formula:

Capacitance observed from point $A=C2+(Cs2a \cdot Csg2a)/(Cs2a+Csg2a)$

Figure 11A:
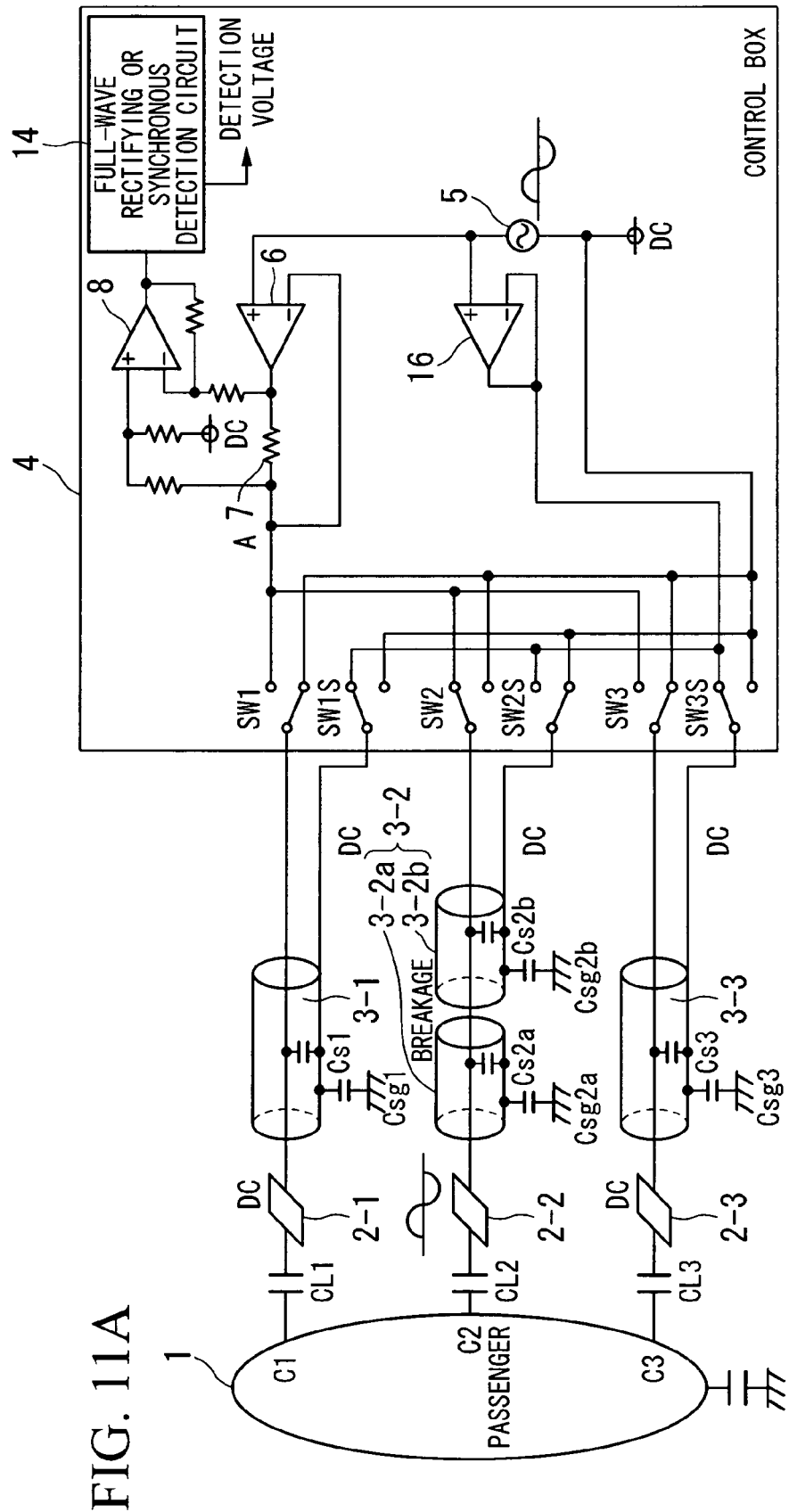
FIG. 11A is also a circuit diagram for explaining the operation when the shield cables are arranged distant from each other, and one of the shield cables itself has a breakage.
Figure 11B:
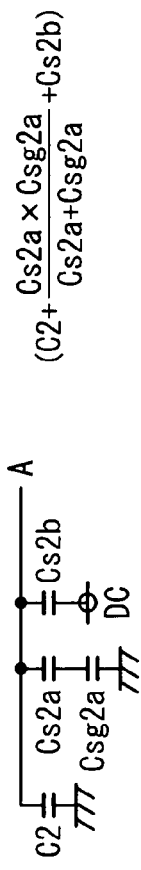
FIG. 11B shows an equivalent circuit of the capacitance observed from the point A in FIG. 11A.

On the other hand, when the switches SW1 to SW3 and the switches SW1S to SW3S are set to the second connection state (see FIG. 11A), the shield 3-2b is connected to the DC voltage DC, so that a current also flows through the capacitances Cs2b and Csg2b, which affect the relevant measurement. Therefore, the equivalent circuit of the capacitance observed from the point A is shown in FIG. 11B, and thus is computed by the following formula:

Capacitance observed from point $A=C2+(Cs2a \cdot Csg2a)/(Cs2a+Csg2a)+Cs2b$

As described above, when a shield breakage occurs on the shield cable 3-2, the measured value has a difference (corresponding to the capacitance Cs2b) between the first and second connection states of the switches SW1 to SW3 and SW1S to SW3S. Also as described above, when there is no breakage (see FIGS. 1A to 2B), the difference between the measured values in both connection states corresponds to the capacitance Cs2. Therefore, in accordance with the difference between the former difference corresponding to Cs2b and the latter difference corresponding to Cs2, it is possible to determine whether there is a breakage of a shield cable.

In addition, the capacitance between the core wire and the shield of a shield cable is proportional to the length of the shield cable. Therefore, if the cable length (in the normal state) is indicated by A+B, the capacitance thereof is indicated by Cs2, and the length of the broken part (toward the switch SW2S) is indicated by B, the following formula is obtained:

$A+B:B=Cs2:Cs2b$

If A+B and Cs2 are predetermined in the specification of the cable, the length B can be computed by using the measured capacitance difference Cs2b, and thus it is possible to determine a spot where the breakage has occurred.

(3-2) In the Case in which the Shield Cables are Arranged Close to Each Other (see FIGS. 12A to 13B)

In this case, when the switches SW1 to SW3 and the switches SW1S to SW3S are set to the first connection state (see FIG. 12A), the AC signal output from the operation amplifier 16 is applied to the shield 3-2b, so that no current flows through the capacitance Cs2b. Accordingly, the capacitance Cs2b does not affect the relevant measurement. In contrast, no AC signal is applied via the switch SW2S to the shield 3-2a due to the breakage. However, when the shield cables are arranged close to each other, the AC signal is applied via a capacitance Cs21a between the shield of the shield cable 3-1 and the shield 3-2a and a capacitance Cs23a between the shield of the shield cable 3-3 and the shield 3-2a. Accordingly, the shield 3-2a and the core wire of the shield cable 3-2 have the same electric potential, so that no current flows through the capacitance Cs2a. Therefore, the capacitance Cs2a does not affect the relevant measurement.

Figure 12A:
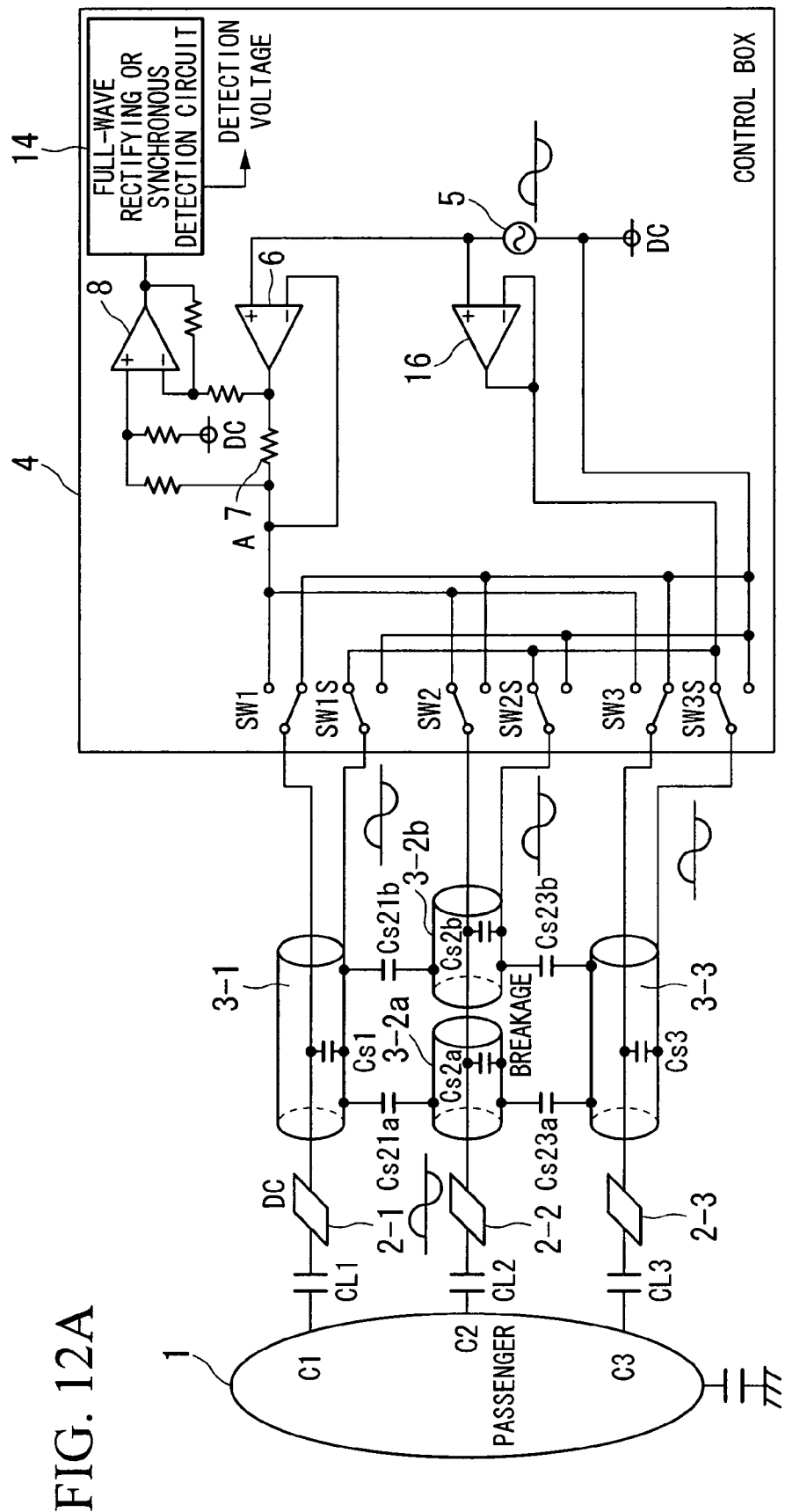
FIG. 12A is a circuit diagram for explaining the operation when the shield cables are arranged close to each other, and one of the shield cables itself has a breakage.
Figure 12B:
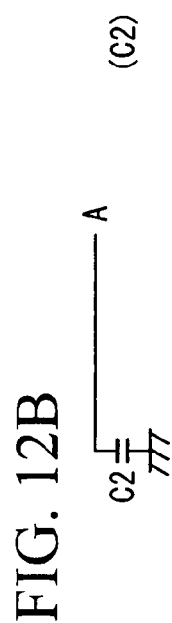
FIG. 12B shows an equivalent circuit of the capacitance observed from the point A in FIG. 12A.

That is, in this case, the capacitance observed from the point A is shown by FIG. 12B, that is, C2.

Figure 13A:
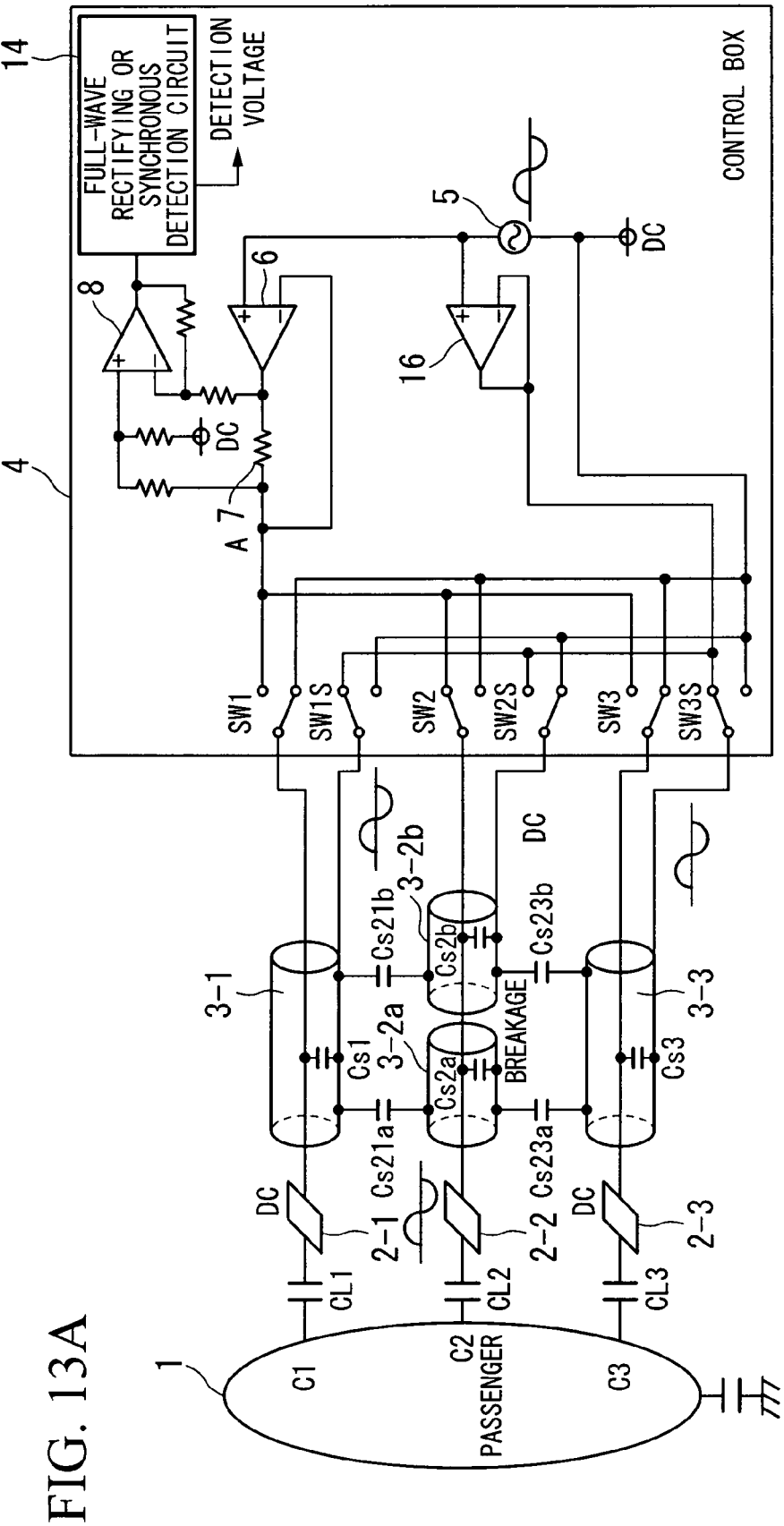
FIG. 13A is also a circuit diagram for explaining the operation when the shield cables are arranged close to each other, and one of the shield cables itself has a breakage.
Figure 13B:
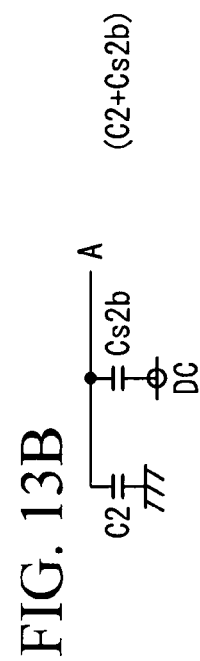
FIG. 13B shows an equivalent circuit of the capacitance observed from the point A in FIG. 13A.

On the other hand, when the switches SW1 to SW3 and the switches SW1S to SW3S are set to the second connection state (see FIG. 13A), the shield 3-2b is connected to the DC voltage DC, so that a current flows through the capacitance Cs2b, which affects the measurement. Therefore, the capacitance observed from the point A is shown by FIG. 13B, that is, "C2+Cs2b".

Accordingly, also when a shield breakage occurs in the shield cable 3-2 while the shield cables are arranged close to each other, the measured value has a difference corresponding to the capacitance Cs2b between the first and second connection states of the switches SW1 to SW3 and SW1S to SW3S, similar to the case shown by FIGS. 10A to 11B. Therefore, based on the difference from the measured-value difference when no breakage occurs, it is possible to determine whether a shield breakage has occurred. In addition, the length B of the shield 3-2b can be obtained based on the measured capacitance Cs2b.

The first embodiment has been explained in detail. The above explanation employs only a case in which an AC signal for measurement is applied to the core wire of the shield cable 3-2. However, in actual measurement, an AC signal for measurement is of course also applied to each of the shield cable 3-1 and 3-3 in accordance with a similar method, so as to measure a target capacitance. In that case, C1 and C3 (respectively corresponding to the shield cable 3-1 and 3-3) each function as a total capacitance, similar to C2 in the above embodiment.

In accordance with the above embodiment, when there is no shield breakage, the capacitances C1, C2, and C3 can be measured, and the state of the passenger 1 can be detected based on the results of the measurement. Additionally, when a breakage occurs in a wiring line connected to a relevant shield or on the shield itself, the breakage can be detected regardless of whether the shield cables are arranged distant from each other or close to each other. Furthermore, when a shield breakage occurs, the spot of the breakage can also be detected.

Other Embodiments

FIGS. 14 to 20 are circuit diagrams, which respectively show second to eighth embodiments of the present invention. In these figures, parts identical to those in FIG. 1A are given identical reference numerals. In addition, "DC" indicates a DC voltage having the same electric potential as the middle point voltage of the signal output from the AC oscillator 5, and "VDD" indicates a source voltage for the operation amplifiers and a multiplexer 25 (VDD is not shown in some of the figures).

Figure 14:
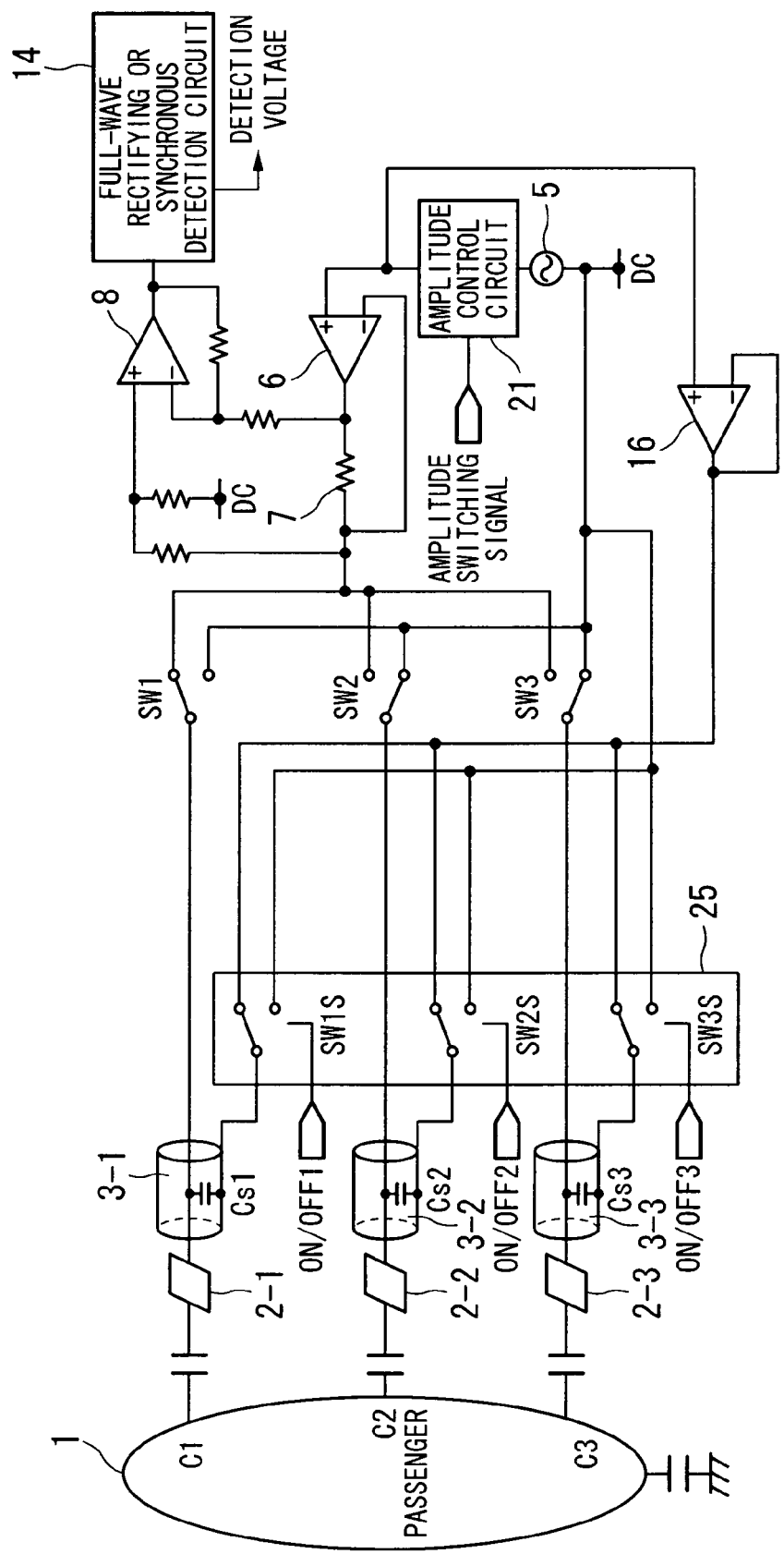
FIG. 14 is a circuit diagram showing the structure of the passenger detection apparatus as a second embodiment in accordance with the present invention.

In comparison with FIG. 1A, the embodiment shown in FIG. 14 has a distinctive feature of providing an amplitude control circuit 21 for switching the amplitude of a sine-wave AC signal. When measuring a capacitance element of a cable, a large amount may be measured depending on the length of the cable. However, the operation amplifier 6 cannot output a signal which exceeds the source voltage VDD. Therefore, in such a case, the amplitude of the original signal is reduced so as to prevent the output signal of the operation amplifier 6 from saturating.

Next, the operation of the present embodiment will be explained.

First, after an AC signal, whose amplitude has been controlled for breakage determination, is output, the switch SW1 is set to the AC output side, while the switches SW2 and SW3 are each set to the DC output side. That is, the DC voltage DC is applied to the sensors 2-2 and 2-3 by setting the switches SW2 and SW3 to the DC output side, so as to positively generate a capacitance element between the sensor 2-1 and the passenger 1. The switches SW1S, SW2S, and SW3S in the multiplexer 25 (i.e., an analog switch) are each set to the AC output side (i.e., toward the operation amplifier 16. The above connection state is called the first connection state.

In this state, the capacitance C1 between the sensor 2-1 and the passenger 1 is measured. Next, only the switch SW1S is set to the DC output side (this connection state is called the second connection state). When there is no defect, the capacitance Cs1 between the core wire and the shield of the shield cable 3-1 is added to the capacitance C1 in the measurement. Therefore, "no breakage" can be determined in accordance with the difference Cs1 between the first and second connection states (see FIGS. 1A, 1B, 3A, 3B, and 6A to 7B).

The first and second connection states have an identical peripheral state with respect to the shield cable 3-1. Therefore, if the shield cable 3-1 has a breakage, the first and second connection states have the same measured value, and thus the difference thereof is zero (see FIGS. 4A to 5B and 8A to 9B).

Similarly, also for the sensors 2-2 and 2-3, after the capacitance with respect to the passenger 1 is measured, the relevant switch SW2 or SW3 is turned to the DC output side so as to measure the capacitance between the core wire and the shield of the switch SW2 or SW3, and the presence/absence of breakage is determined based on the measured capacitance.

Figure 15:
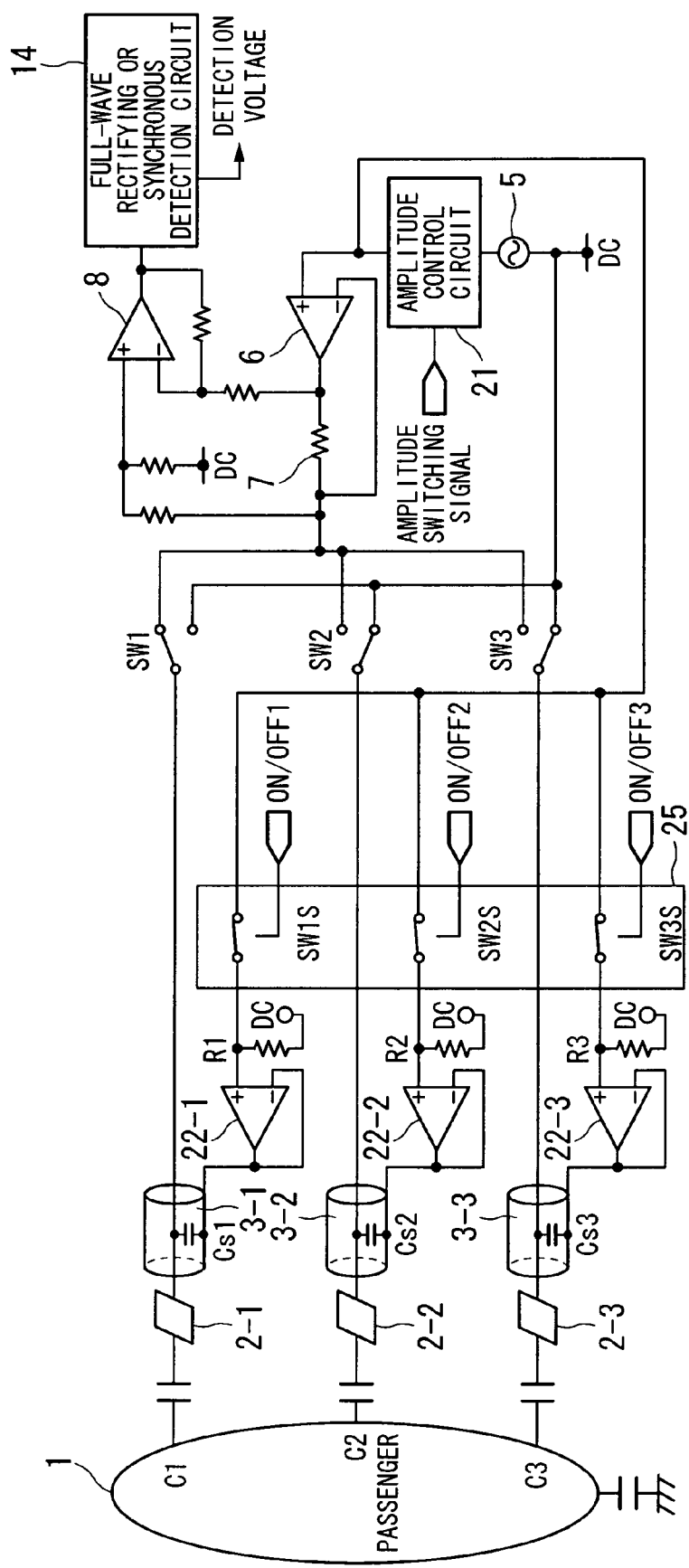
FIG. 15 is a circuit diagram showing the structure of the passenger detection apparatus as a third embodiment in accordance with the present invention.

FIG. 15 shows a structure in which the switches SW1S to SW3S in the multiplexer 25 in FIG. 14 are each modified to a two-point type, and operation amplifiers 22-1 to 22-3 and pull-up resistors R1 to R3 for a DC voltage are provided behind the switches.

The procedure for shield breakage determination is similar to that for the structure in FIG. 14. In order to apply an AC signal to a relevant shield, the corresponding switch SW1S, SW2S, or SW3S is turned on. In contrast, in order to apply a DC signal, the relevant switch is turned off, so that the DC voltage is applied to the positive input terminal of the relevant operation amplifier 22-1, 22-2, or 22-3 via the corresponding resistor R1, R2, or R3, so that the relevant shield has a DC electric potential.

In FIGS. 14 and 15, when determining whether there is a shield breakage, the middle point voltage DC of the signal output from the AC oscillator 5 is used as the DC voltage applied to the relevant shield. However, the detection apparatus detects a change in the capacitance element by referring to a variation in the AC element of the current which flows through the current detection resistor. Therefore, the DC electric potential applied to the shield is not necessarily the middle-point electric potential of the signal output from the AC oscillator 5, and may be the GND electric potential, or the source voltage VDD of the operation amplifiers may be used. In addition, the absolutely necessary condition is that a current flows through a capacitance element (or the current detection resistor 7). Therefore, the voltage applied to the relevant shield is not necessarily a DC voltage, and an AC signal having a different waveform (i.e., different level) from the signal output from the operation amplifier 6 may be used. That is, any signal can be used if the signal-level difference between this signal and the signal output from the operation amplifier 6 temporally varies, that is, if a displacement current flows through a relevant capacitance element due to the signal.

Figure 16:
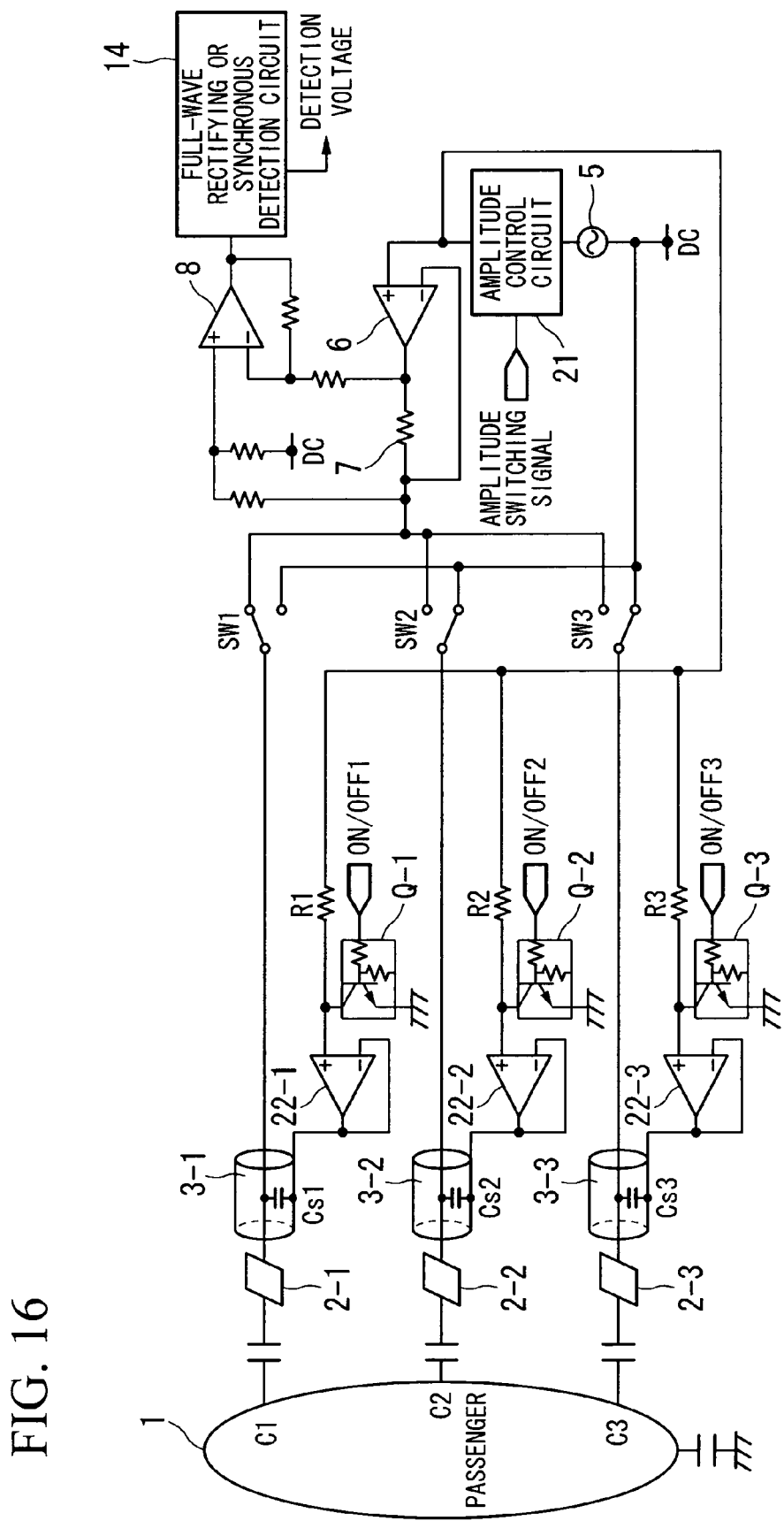
FIG. 16 is a circuit diagram showing the structure of the passenger detection apparatus as a fourth embodiment in accordance with the present invention.

FIG. 16 shows an example in which a voltage of the GND level is used as a DC voltage to be output to the shield cables 3-1 to 3-3. The procedure of determining whether there is a shield breakage is the same as that performed for the structure of FIG. 14. In FIG. 16, transistors Q-1 to Q-3 are provided, which correspond to the switches SW1S, SW2S, and SW3S in the multiplexer 25 in FIG. 15. When outputting an AC signal to a relevant shield, the base signal of the relevant transistor Q-1, Q-2, or Q-3 is set to Low (i.e., the low level). When outputting a DC (i.e., GND) signal, the base signal is set to Hi (i.e., the high level), so that the relevant transistor Q-1, Q-2, or Q-3 is switched on. Accordingly, the electric potential of the positive input terminal of the corresponding operation amplifier 22-1, 22-2, or 22-3 becomes 0V, and a DC signal corresponding to the GND level is output to the relevant shield.

Figure 17:
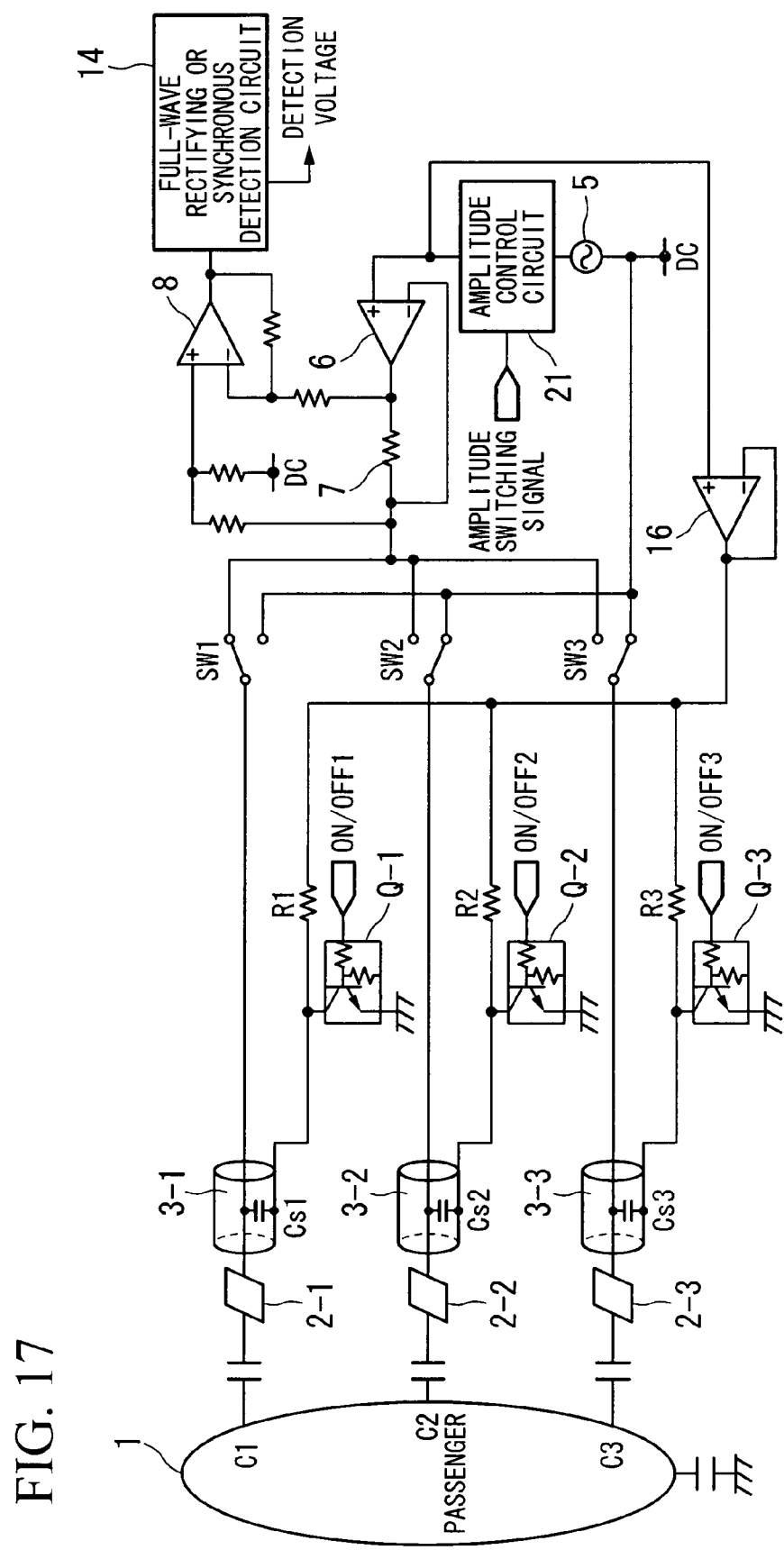
FIG. 17 is a circuit diagram showing the structure of the passenger detection apparatus as a fifth embodiment in accordance with the present invention.

Similar to FIG. 16, FIG. 17 shows an example in which a voltage of the GND level is used as the DC voltage applied to a relevant shield. The operation amplifier 16 has a performance for sufficiently driving the transistors Q-1, Q-2, and Q-3 when they are turned on. The procedure of determining whether there is a shield breakage is the same as that performed for the structure of FIG. 14. In FIG. 17, transistors Q-1 to Q-3 are provided, which correspond to the switches SW1S, SW2S, and SW3S in the multiplexer 25 in FIG. 14. When outputting an AC signal to a relevant shield, the base signal of the relevant transistor Q-1, Q-2, or Q-3 is set to Low. When outputting a DC (i.e., GND) signal, the base signal is set to Hi, so that the relevant transistor Q-1, Q-2, or Q-3 is switched on. Accordingly, a DC signal corresponding to the GND level is applied to the shield.

Figure 18:
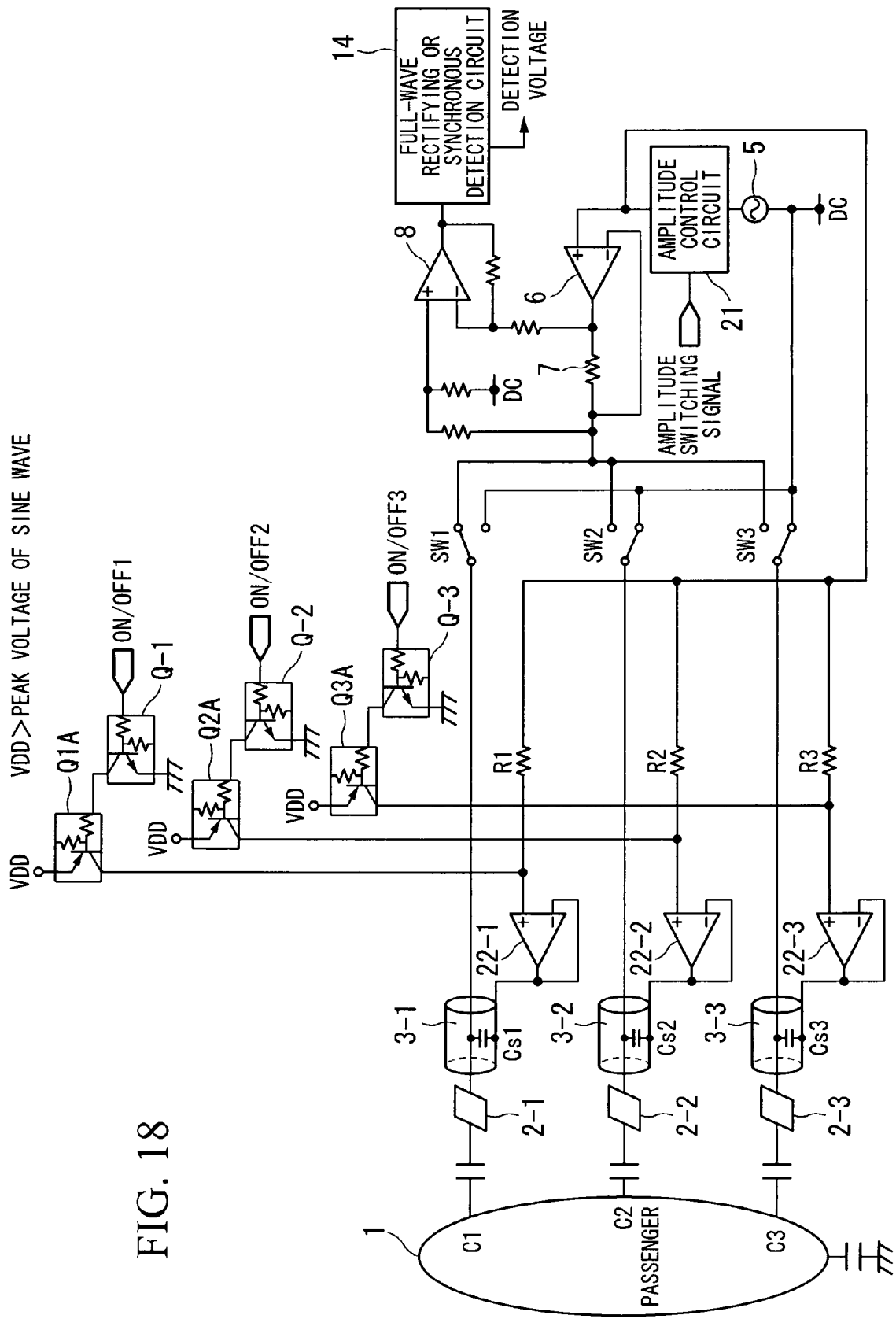
FIG. 18 is a circuit diagram showing the structure of the passenger detection apparatus as a sixth embodiment in accordance with the present invention.

FIG. 18 shows an example in which the VDD voltage (which is higher than the amplitude of the AC signal applied to each core wire) is used as the DC voltage applied to a relevant shield. The procedure of determining whether there is a shield breakage is the same as that performed for the structure of FIG. 14. In the structure of FIG. 18, transistors Q-1 to Q-3 and Q1A to Q3A are provided, which correspond to the switches SW1S to SW3S in the multiplexer 25 in FIG. 15. When outputting an AC signal to a relevant shield, the base signal of the relevant transistor Q-1, Q-2, or Q-3 is set to Low. When outputting a DC (i.e., VDD) signal, the base signal is set to Hi, so that the relevant transistors "Q-1 and Q1A", "Q-2 and Q2A", or "Q-3 and Q3A" are switched on. Accordingly, the electric potential of the positive input terminal of the corresponding operation amplifier 22-1, 22-2, or 22-3 becomes VDD, and a DC signal corresponding to VDD is output to the relevant shield.

Figure 19:
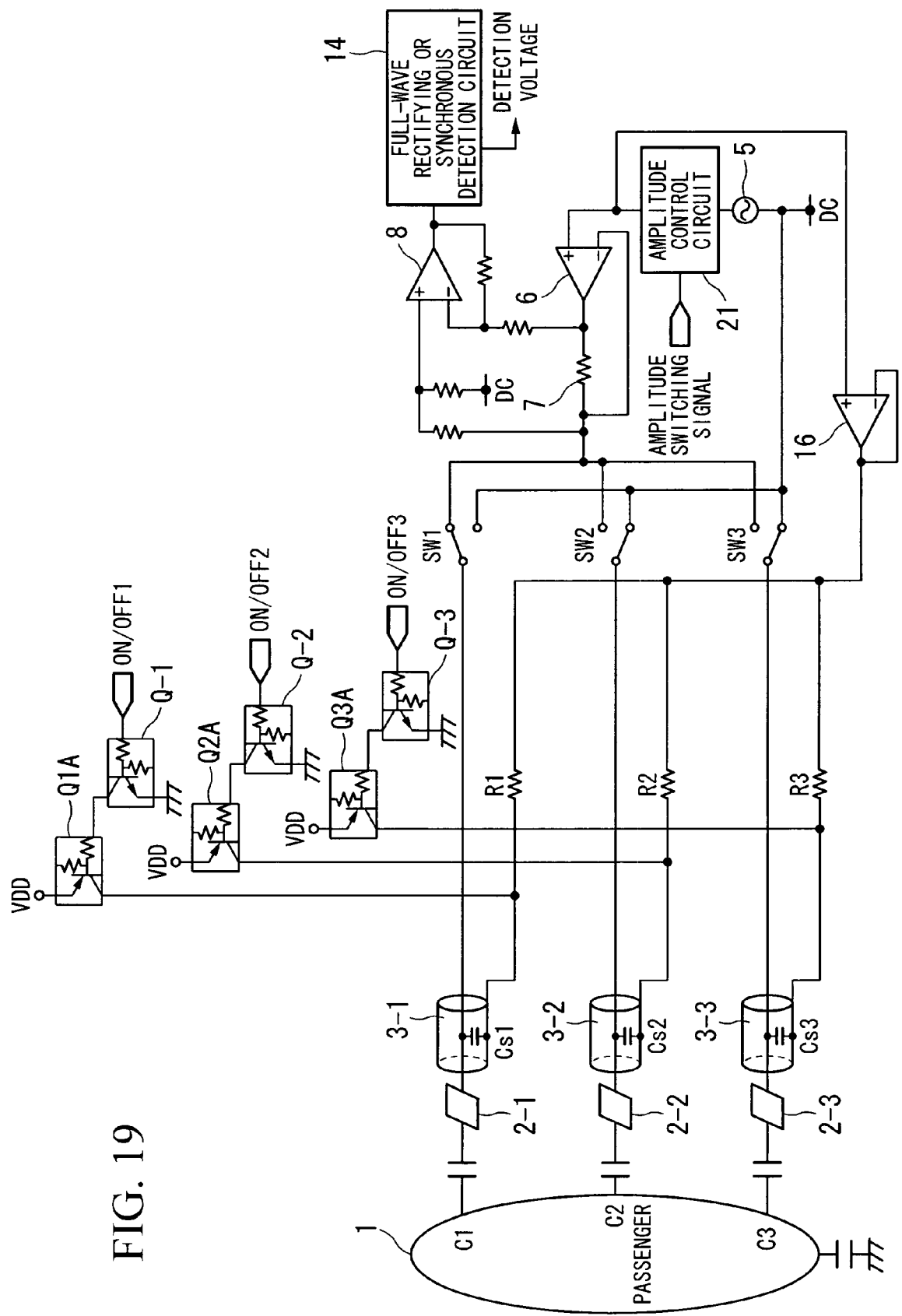
FIG. 19 is a circuit diagram showing the structure of the passenger detection apparatus as a seventh embodiment in accordance with the present invention.

FIG. 19 shows an example in which the VDD voltage is also used as the DC voltage applied to a relevant shield. The operation amplifier 16 has a performance for sufficiently driving the transistors Q-1, Q-2, and Q-3 and Q1A, Q2A, and Q3A when they are turned on. The procedure of determining whether there is a shield breakage is the same as that performed for the structure of FIG. 14. In the structure of FIG. 19, transistors Q-1 to Q-3 and Q1A to Q3A are provided, which correspond to the switches SW1S to SW3S in the multiplexer 25 in FIG. 15. When outputting an AC signal to a relevant shield, the base signal of the relevant transistor Q-1, Q-2, or Q-3 is set to Low. When outputting a DC (i.e., VDD) signal, the base signal is set to Hi, so that the relevant transistors "Q-1 and Q1A", "Q-2 and Q2A", or "Q-3 and Q3A" are switched on. Accordingly, a DC signal corresponding to the VDD level is applied to the shield.

Figure 20:
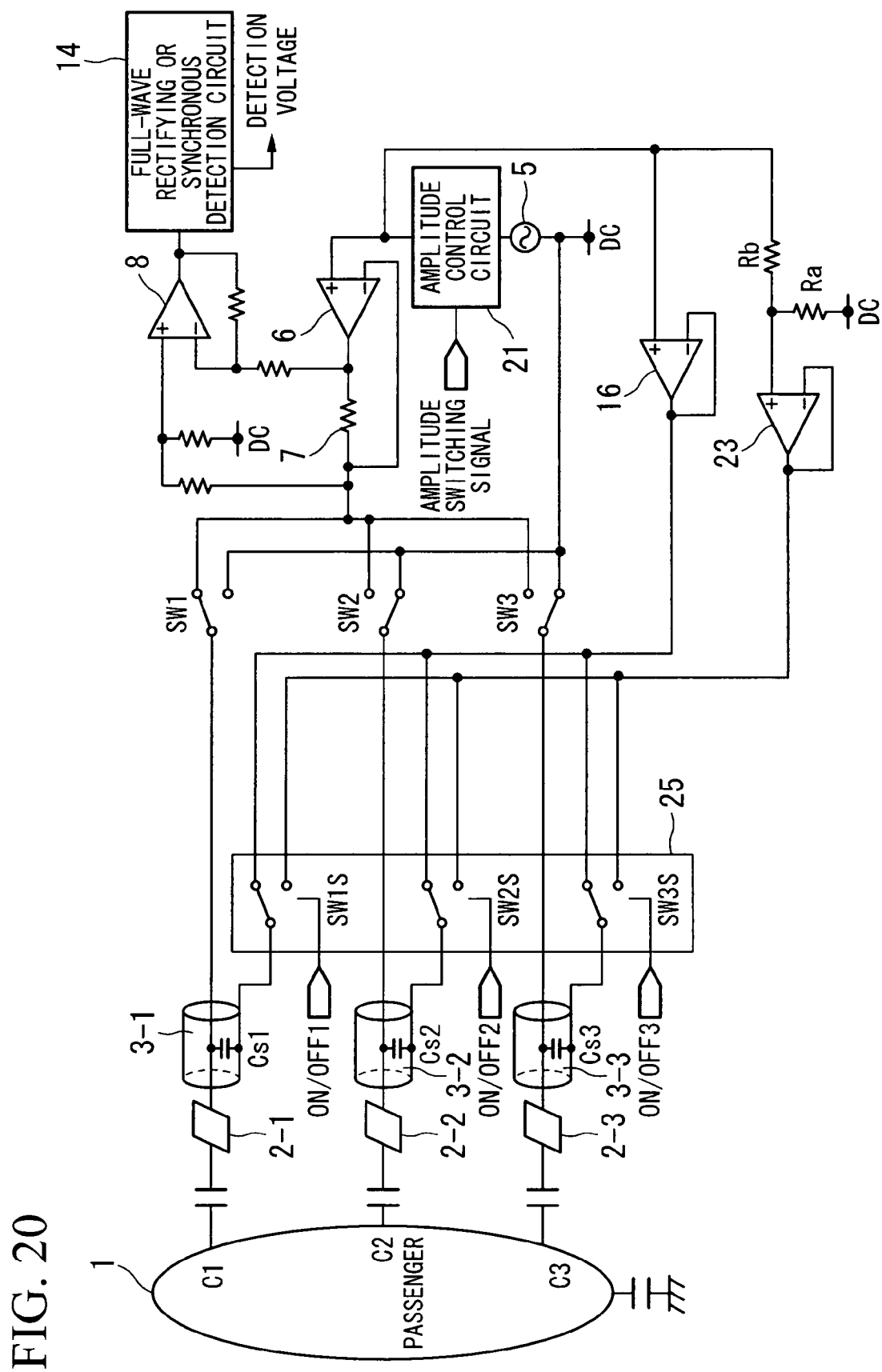
FIG. 20 is a circuit diagram showing the structure of the passenger detection apparatus as an eighth embodiment in accordance with the present invention.

FIG. 20 shows a circuit example in which a sine-wave AC signal, which has the identical phase but a different amplitude in comparison with the sine-wave AC signal output from the operation amplifier 6, is output (instead of a DC signal) for determining whether there is a shield breakage. The procedure of determining whether there is a shield breakage is the same as that performed for the structure of FIG. 14. On the line to which a DC signal is applied to a relevant shield in FIG.

14, an AC signal is output via an operation amplifier 23, where the AC signal is obtained by subjecting the amplitude of the signal output from the amplitude control circuit 21 to a division with respect to "Ra/(Ra+Rb)" for resistors Ra and Rb, that is, by multiplying the amplitude of the signal output from the amplitude control circuit 21 by "Ra/(Ra+Rb)". When applying the signal output from the operation amplifier 23 to a relevant shield, an electric-potential difference, which corresponds to "(first sine wave)−(second sine wave)", occurs between the above applied signal and the AC signal of the core wire. Therefore, a current flows through the capacitance between the relevant core wire and shield. Accordingly, similar to the case in which the DC voltage is output, the presence/absence of a shield breakage can be determined based on the measured value.

In this example, a sine-wave AC signal, which has the identical phase but a different amplitude in comparison with the sine-wave AC signal output from the operation amplifier 6, is output as a signal applied to a relevant shield. However, the identical phase is not an absolute condition, and any signal can be used if the signal-level difference between this signal and the signal output from the operation amplifier 6 temporally varies, that is, if a displacement current flows through a relevant capacitance element due to the signal.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

INDUSTRIAL APPLICABILITY

The present invention can be used for detecting a seated condition of a passenger in a vehicle such as an automobile.

What is claimed is:

1. A passenger detection apparatus comprising: a plurality of sensors arranged on a seat in a vehicle; a plurality of shield cables corresponding to the sensors, wherein each shield cable has a shield and a core wire, wherein one end of the core wire is connected to the corresponding one of the sensors; a measurement signal output device for outputting a measurement AC signal; a current detection device for detecting a current output from the measurement signal output device; a canceling signal output device for outputting a capacitance canceling AC signal, which has the same phase and the same level as those of the measurement AC signal; a first selection device for selectively applying one of the measurement AC signal and a DC voltage to the other end of each shield cable; and a second selection device for selectively applying one of the capacitance canceling AC signal and a second signal, which has a different waveform from that of the measurement AC signal, to the shield of each shield cable.

2. The passenger detection apparatus in accordance with claim 1, further comprising:
a control device for controlling the first selection device and the second selection device, wherein the control device performs:
a first process of controlling the first selection device so as to apply the measurement AC signal to a target one of the sensors via the core wire of the corresponding shield cable and to simultaneously apply the DC voltage to the other sensors via the core wires of the corresponding shield cables, and also controlling the second selection device so as to apply the capacitance canceling AC signal to the shield of each shield cable; and
a second process of controlling the first selection device so as to apply the measurement AC signal to the target sensor via the core wire of the corresponding shield cable, and to simultaneously apply the DC voltage to the other sensors via the core wires of the corresponding shield cables, and also controlling the second selection device so as to apply the second signal to the shield of the shield cable connected to the target sensor, and to simultaneously apply the capacitance canceling AC signal to the shield of each shield cable connected to the other sensors.

3. The passenger detection apparatus in accordance with claim 1, further comprising:
an adjustment device for adjusting the level of the measurement AC signal and the capacitance canceling AC signal.

4. The passenger detection apparatus in accordance with claim 1, wherein the second selection device includes:
a switch device for switching on or off the capacitance canceling AC signal in accordance with the control of the control device; and
an amplifier for amplifying the capacitance canceling AC signal when the switch device is on, so as to apply the amplified signal to the shield of the relevant shield cable, and amplifying the second signal when the switch device is off, so as to apply the amplified signal to the above shield.

5. The passenger detection apparatus in accordance with claim 1, wherein the second selection device includes:
an amplifier for amplifying the capacitance canceling AC signal; and
a transistor for grounding an input terminal of the amplifier in accordance with the control of the control device.

6. The passenger detection apparatus in accordance with claim 1, wherein the second selection device includes:
a resistor for applying the capacitance canceling AC signal to the shield of the relevant shield cable; and
a transistor for grounding a part between the resistor and the relevant shield cable in accordance with the control of the control device.

7. The passenger detection apparatus in accordance with claim 1, wherein the second selection device includes:
an amplifier for amplifying the capacitance canceling AC signal; and
a transistor for connecting an input terminal of the amplifier to a positive voltage terminal in accordance with the control of the control device.

8. The passenger detection apparatus in accordance with claim 1, wherein the second selection device includes:
a resistor for applying the capacitance canceling AC signal to the shield of the relevant shield cable; and
a transistor for connecting a part between the resistor and the relevant shield cable to a positive voltage terminal in accordance with the control of the control device.

9. The passenger detection apparatus in accordance with claim 1, further comprising:
an AC signal output device for outputting an AC signal, which has a different waveform from that of the measurement AC signal and functions as the second signal.

10. The passenger detection apparatus in accordance with claim 1, wherein the second signal is a DC voltage.

* * * * *